United States Patent
Ross et al.

(10) Patent No.: US 9,574,622 B2
(45) Date of Patent: *Feb. 21, 2017

(54) LATCHING CLUTCH CONTROL SYSTEM

(71) Applicant: GM Global Technology Operations LLC, Detroit, MI (US)

(72) Inventors: Craig S. Ross, Ypsilanti, MI (US); Paul G. Otanez, Troy, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 194 days.

This patent is subject to a terminal disclaimer.

(21) Appl. No.: 13/857,429

(22) Filed: Apr. 5, 2013

(65) Prior Publication Data

US 2013/0281253 A1 Oct. 24, 2013

Related U.S. Application Data

(60) Provisional application No. 61/636,963, filed on Apr. 23, 2012.

(51) Int. Cl.
| | |
|---|---|
| *F16D 25/12* | (2006.01) |
| *F16H 3/62* | (2006.01) |
| *F16D 25/10* | (2006.01) |
| *F16D 48/02* | (2006.01) |

(Continued)

(52) U.S. Cl.
CPC ............... *F16D 25/14* (2013.01); *F16D 48/02* (2013.01); *F16D 48/0206* (2013.01); *F16H 3/62* (2013.01); *F16H 61/0267* (2013.01); *F16K 31/122* (2013.01); *F16D 2048/0203* (2013.01); *F16D 2048/0221* (2013.01); *F16D 2048/0233* (2013.01); *F16D 2048/0263* (2013.01); *F16D 2048/0266* (2013.01); *F16D 2048/0275* (2013.01); *F16H 2061/0279* (2013.01); *F16H 2200/201* (2013.01); *F16H 2200/2043* (2013.01); *F16H 2312/14* (2013.01)

(58) Field of Classification Search
CPC ................ F16D 2048/0233; F16D 2048/0263; F16D 2048/0266; F16D 2048/0275; F16D 2048/0203; F16H 2061/0279; F16H 61/0267; F16H 61/4043
USPC .......... 475/117, 127, 128; 192/85.63; 60/436
See application file for complete search history.

(56) References Cited

U.S. PATENT DOCUMENTS

| | | | |
|---|---|---|---|
| 6,988,972 B2 * | 1/2006 | Usoro et al. ................. | 475/275 |
| 6,997,844 B2 * | 2/2006 | Bucknor et al. ............. | 475/275 |
| 7,090,610 B2 * | 8/2006 | Usoro et al. ................. | 475/276 |

(Continued)

*Primary Examiner* — Ramya Burgess
*Assistant Examiner* — Lillian Nguyen

(57) ABSTRACT

A system is provided for latching and draining a torque transmitting device. The system may include a clutch feed channel having an inlet portion and a clutch portion. The inlet portion is configured to provide hydraulic fluid from a pressurized source to the clutch portion. The clutch portion is configured to provide hydraulic fluid to a torque transmitting device. An inlet valve connects the inlet portion of the clutch feed channel to the clutch portion of the clutch feed channel. The inlet valve is configured to open to allow the hydraulic fluid to flow from the inlet portion to the clutch portion when the torque transmitting device is engaged. The inlet valve is configured to close and to trap hydraulic fluid within the torque transmitting device when the torque transmitting device is not actively pressurized. A multispeed transmission is also provided.

16 Claims, 15 Drawing Sheets

(51) Int. Cl.
*F16K 31/122* (2006.01)
*F16H 61/02* (2006.01)

(56) References Cited

U.S. PATENT DOCUMENTS

| | | | |
|---|---|---|---|
| 8,556,765 B2 | 10/2013 | Bockenstette et al. | |
| 8,561,640 B2 | 10/2013 | McConnell et al. | |
| 2007/0117671 A1* | 5/2007 | Long et al. | 475/116 |
| 2008/0188344 A1* | 8/2008 | Raghavan et al. | 475/276 |
| 2009/0275441 A1* | 11/2009 | Bai | 477/150 |
| 2010/0179020 A1* | 7/2010 | Wittkopp et al. | 475/276 |
| 2011/0011074 A1* | 1/2011 | Mellet | F16H 61/0021 60/329 |
| 2011/0167812 A1* | 7/2011 | Moorman | F16D 48/0206 60/484 |
| 2011/0180364 A1* | 7/2011 | Czoykowski et al. | 192/85.63 |
| 2011/0209470 A1* | 9/2011 | Dougan et al. | 60/413 |
| 2013/0233396 A1 | 9/2013 | Lee et al. | |
| 2013/0296093 A1* | 11/2013 | Ross et al. | 475/127 |

* cited by examiner

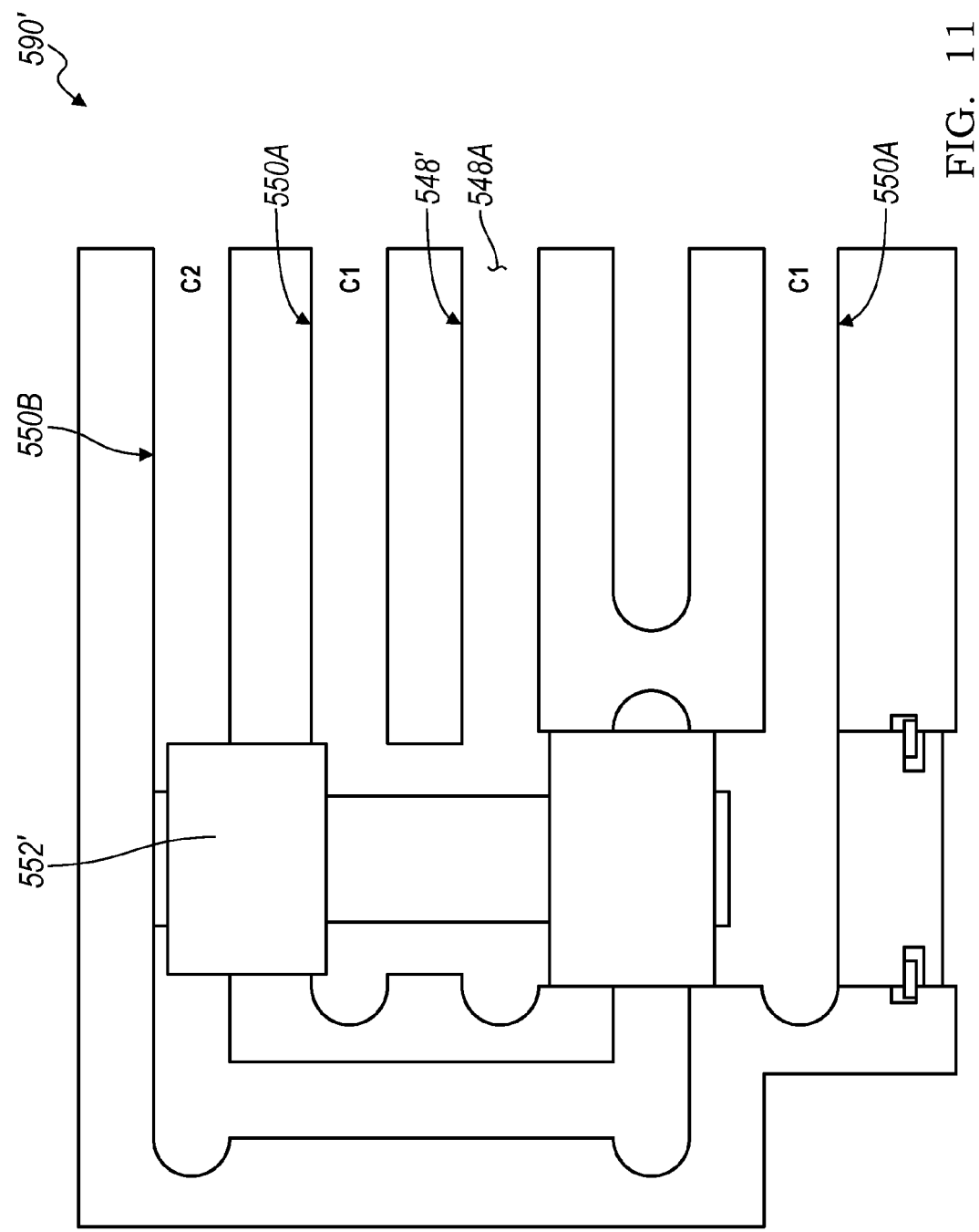

LATCHING CLUTCH CONTROL SYSTEM

CROSS-REFERENCE TO RELATED APPLICATIONS

This application claims the benefit of U.S. Provisional Application No. 61/636,963 filed on Apr. 23, 2012. The disclosure of the above application is incorporated herein by reference.

FIELD

The present invention relates to a system for use in an automatic transmission having torque-transmitting devices that are selectively engageable to achieve multiple gear ratios. More specifically, the present invention relates to a control system for latching and unlatching fluid pressure within a torque-transmitting device.

BACKGROUND

The statements in this section merely provide background information related to the present disclosure and may or may not constitute prior art.

A typical multiple speed transmission uses a combination of a plurality of torque transmitting mechanisms, planetary gear arrangements and fixed interconnections to achieve a plurality of gear ratios. The number and physical arrangement of the planetary gear sets, generally, are dictated by packaging, cost and desired speed ratios.

In order to increase the fuel economy of motor vehicles, it may be desirable to stop the engine during certain circumstances, such as when stopped at a red light or idling. However, after the engine has been shut down and has remained off for an extended period of time, the fluid generally tends to drain down from the passages into a transmission sump under the force of gravity. Upon engine restart, the transmission may take an appreciable amount of time to establish pressure before full transmission operation may resume.

In some powertrain systems, it is also generally desirable to have quick shift timing. In addition, in engine stop/start systems, it is desirable to have quick system recovery. As such, it may be desirable to maintain pressure in a clutch, even when line pressure and/or clutch feed pressure is zero or near zero. In other situations, however, clutch pressure should be eliminated, such as when putting a vehicle in reverse. Accordingly, there is a need for a clutch pressure control system that allows for timely shifting and recovery, even if the engine or motor is shut off, but that also allows a vehicle to move in reverse or to otherwise deactivate a clutch or multiple clutches, if desired.

SUMMARY

The present disclosure provides a latching system to retain clutch pressure for one or more torque transmitting mechanisms in an automatic transmission, and to release clutch pressure when desired.

In one variation, which may be combined with or separate from the other variations described herein, a one-way valve, such as a ball check-valve, is located between the torque transmitting mechanism and the control fluid that feeds the torque transmitting mechanism, allowing fluid to flow into the clutch cavity of the torque transmitting mechanism but not to return therefrom. A bypass valve is placed in parallel with the one-way valve to allow fluid to flow from the clutch cavity when it is desired to release clutch pressure, such as when the vehicle is put in reverse.

In another variation, which may be combined with or separate from the other variations described herein, a latching valve permits a torque transmitting mechanism to be fed with hydraulic fluid, latches the hydraulic fluid within the torque transmitting mechanism, and releases the hydraulic fluid from the torque transmitting mechanism.

In yet another variation, which may be combined with or separate from the other variations described herein, a hydraulic fluid latching system for a torque transmitting device of a vehicular transmission is provided. The hydraulic fluid latching system includes a clutch feed channel having an inlet portion and a clutch portion. The inlet portion is configured to provide hydraulic fluid from a pressurized source to the clutch portion. The clutch portion is configured to provide hydraulic fluid to a torque transmitting device. An inlet valve connects the inlet portion of the clutch feed channel to the clutch portion of the clutch feed channel. The inlet valve is configured to open to allow the hydraulic fluid to flow from the inlet portion to the clutch portion when the torque transmitting device is engaged. The inlet valve is further configured to close and to trap hydraulic fluid within the torque transmitting device when the torque transmitting device is not actively pressurized through the inlet portion.

In still another variation, which may be combined with or separate from the other variations described herein, a hydraulic control system in a transmission is provided. The hydraulic control system includes a source of pressurized hydraulic fluid for providing a pressurized hydraulic fluid. A main line circuit is in fluid communication with the source of pressurized hydraulic fluid. A clutch feed channel is in fluid communication with the source of pressurized hydraulic fluid. The clutch feed channel has an inlet portion and a clutch portion. The inlet portion is configured to provide hydraulic fluid from the main line circuit to the clutch portion. The clutch portion is configured to provide hydraulic fluid to a torque transmitting device. An inlet valve connects the inlet portion of the clutch feed channel to the clutch portion of the clutch feed channel. The inlet valve is configured to open to allow hydraulic fluid to flow from the inlet portion to the clutch portion when the torque transmitting device is engaged. The inlet valve is further configured to close to trap hydraulic fluid within the torque transmitting device when the torque transmitting device is not actively pressurized through the inlet portion.

In still another variation, which may be combined with or separate from the other variations described herein, a multiple speed automatic transmission is provided. The transmission includes an input member, an output member, and first, second, and third planetary gear sets each having first, second and third members. A first interconnecting member continuously interconnects the first member of the first planetary gear set with the second member of the second planetary gear set. A second interconnecting member continuously interconnects the second member of the first planetary gear set with the third member of the third planetary gear set. A third interconnecting member continuously interconnects the third member of the second planetary gear set with the second member of the third planetary gear set. Five torque transmitting devices are each selectively engageable to interconnect at least one of the first, second, and third members with at least one other of the first members, second members, third members and a stationary member. The torque transmitting devices are selectively engageable to establish a plurality of forward speed ratios and at least one reverse speed ratio between the input member and the output member. A first torque transmitting device of the five torque transmitting devices is in communication with a clutch feed channel having an inlet portion and a clutch portion. The inlet portion is configured to provide hydraulic fluid from a pressurized source to the clutch portion. The clutch portion is configured to provide hydraulic fluid to the first torque transmitting device. An inlet valve connects the inlet portion of the clutch feed channel to the clutch portion of the clutch feed channel. The inlet valve is configured to open to allow hydraulic fluid to flow from the inlet portion to the clutch portion of the clutch feed channel when the first torque transmitting device is engaged. The inlet valve is further configured to close to trap hydraulic fluid within the first torque transmitting device when the first torque transmitting device is not actively pressurized through the inlet portion.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings:

FIG. 11 is a cross-sectional view of a variation of a control fluid circuit, in accordance with the principles of the present disclosure.

DETAILED DESCRIPTION

The following description is merely exemplary in nature and is not intended to limit the present disclosure, application, or uses.

Figure 1:
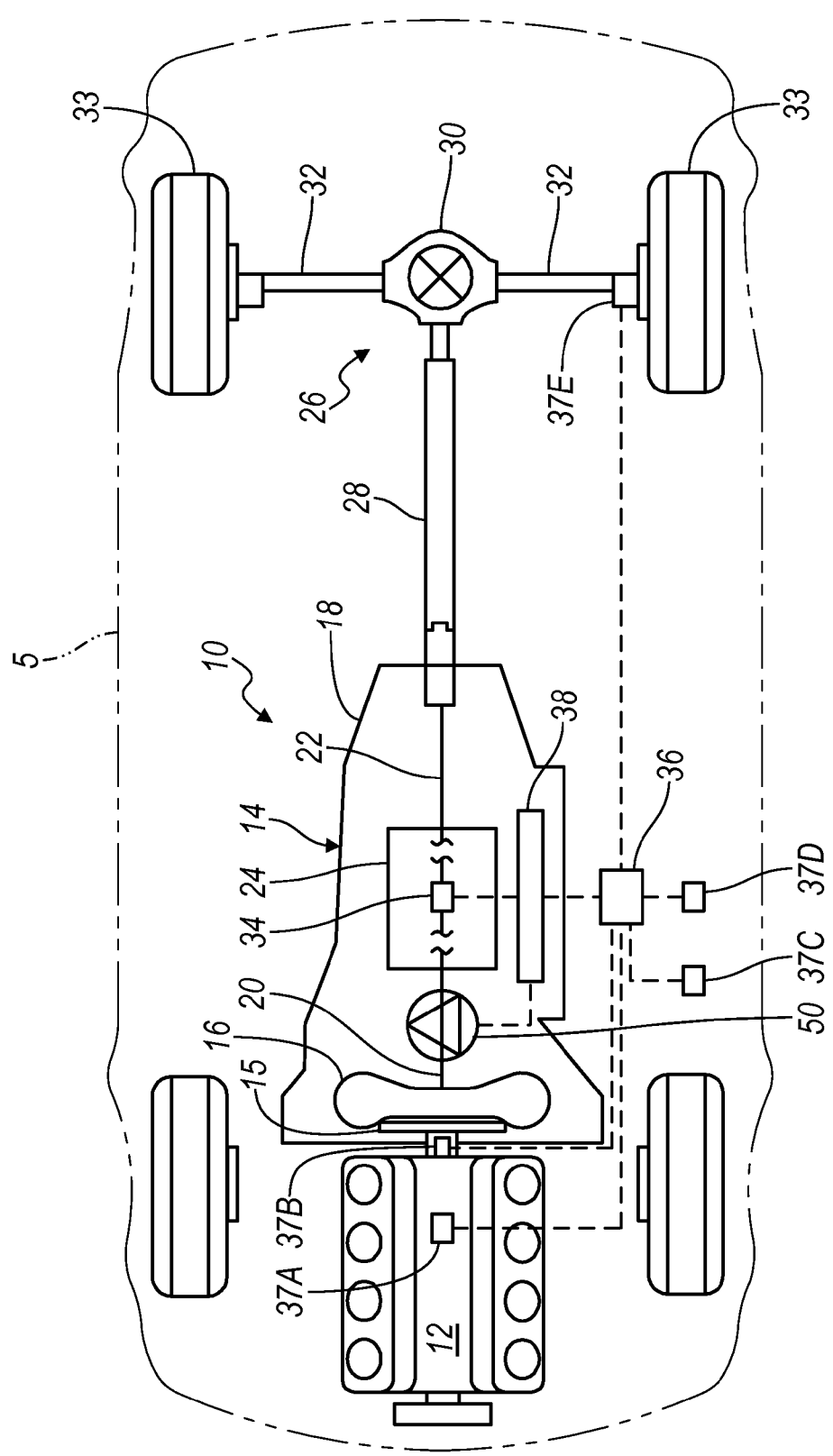
FIG. 1 is a schematic diagram of an exemplary powertrain in a motor vehicle according to the principles of the present disclosure.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric motor, or any other type of prime mover, without departing from the scope of the present disclosure. The engine 12 supplies a driving torque to the transmission 14 through a flexplate 15 or other connecting device that is connected to a starting device 16. The starting device 16 may be a hydrodynamic device, such as a fluid coupling or torque converter, a wet or dry clutch, or an electric motor. It should be appreciated that any starting device between the engine 12 and the transmission 14 may be employed.

The transmission 14 includes a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The motor vehicle 5 includes a control system 36. The control system 36 may include a transmission control module, an engine control module, or a hybrid control module, or any other type of controller. The control system 36 may include one or more electronic control devices having a preprogrammed digital computer or processor, control logic, memory used to store data, and at least one I/O peripheral. The control logic includes a plurality of logic routines for monitoring, manipulating, and generating data. The control module 36 controls the actuation of the clutches/brakes 34 via a hydraulic control system 38. The hydraulic control system 38 is operable to selectively engage the clutches/brakes 34 by selectively communicating a hydraulic fluid, for example, from a pump 50, to the clutches/brakes 34 that engages the clutches/brakes 34. The control module 36 is also in communication with a plurality of sensors located throughout the motor vehicle 5. For example, the control module 36 communicates with engine speed and temperature sensors 37A and 37B, a brake pedal position sensor 37C, an ignition key sensor 37D, a vehicle speed sensor 37E, to name but a few.

Figure 2:
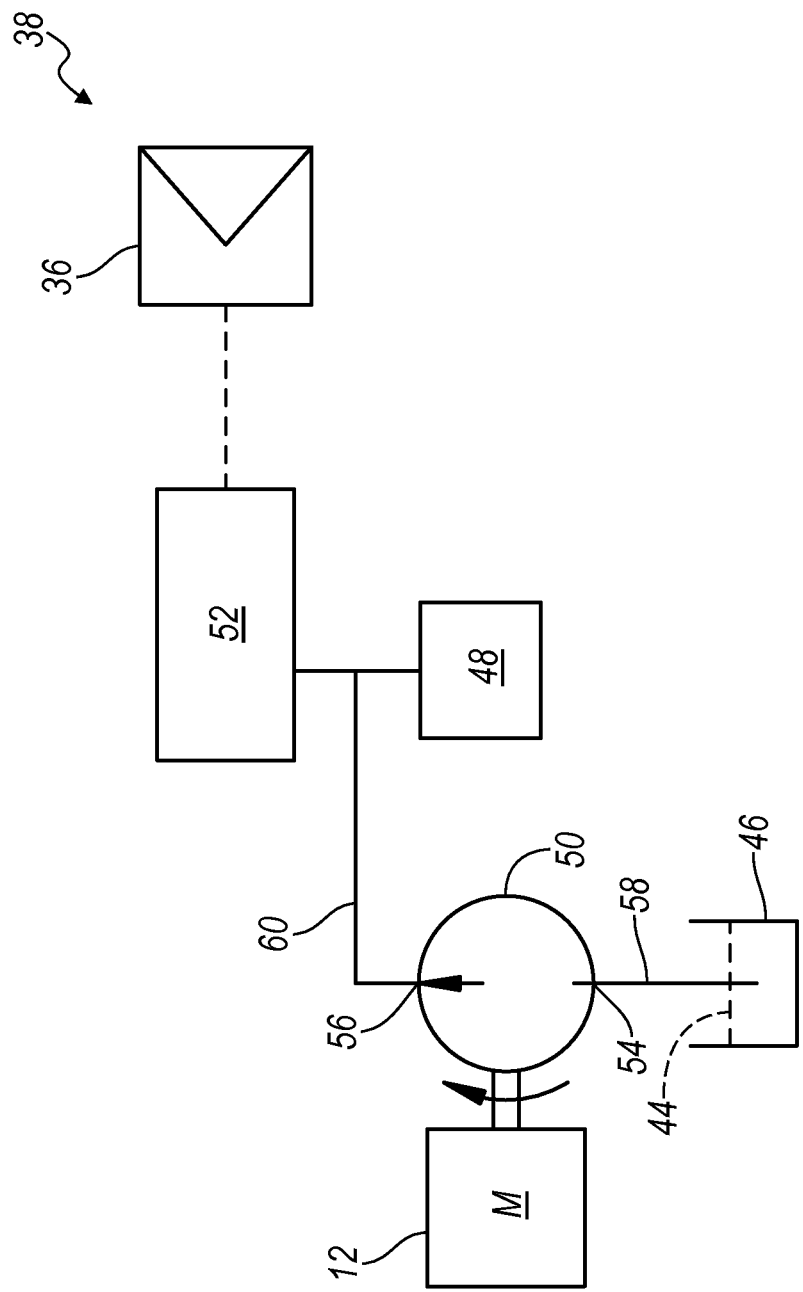
FIG. 2 is a schematic diagram of a portion of an exemplary hydraulic control system in accordance with the principles of the present disclosure.

Turning to FIG. 2, a portion of the hydraulic control system 38 is illustrated. At the outset it should be appreciated that the portion of the hydraulic control system 38 shown in FIG. 2 is exemplary and that other configurations may be employed. The hydraulic control system 38 is operable to selectively engage the clutches/brakes 34 by selectively communicating a hydraulic fluid 44, such as automatic transmission fluid, from a sump 46 to a clutch actuation circuit 48. The controller 36 may control the hydraulic control system 38, by way of example. The clutch actuation circuit 48 includes clutch control solenoids, valves, and actuators operable to engage the plurality of clutches/brakes 34. The hydraulic fluid 44 is communicated to the clutch actuation circuit 48 under pressure from either a pump 50, which is driven by the engine 12, or an accumulator circuit 52.

The sump 46 is a tank or reservoir to which the hydraulic fluid 44 returns and collects from various components and regions of the automatic transmission 14. The hydraulic fluid 44 is forced from the sump 46 and communicated throughout the hydraulic control system 38 via the pump 50. The pump 50 may be, for example, a gear pump, a vane pump, a gerotor pump, or any other positive displacement pump. The pump 50 includes an inlet port 54 and an outlet port 56. The inlet port 54 communicates with the sump 46 via a suction line 58. The outlet port 56 communicates pressurized hydraulic fluid 44 to a main line pressure circuit 60. The main line pressure circuit 60 may include various optional features including, for example, a spring biased blow-off safety valve, a pressure side filter, or a spring biased check valve.

The main line pressure circuit 60 communicates with the clutch actuation circuit 48, and it may also communicate with an accumulator circuit 52. The accumulator is an energy storage device in which the non-compressible hydraulic fluid 44 is held under pressure by an external source. The accumulator circuit 52 may include an accumulator, a solenoid, and/or a pressure sensor or estimator, by way of example. Other types of sensors, such as volume or position sensors, may also be included. While the accumulator circuit 52 is illustrated as being connected to and therefore charged by the main line pressure circuit 60, it should be understood that the accumulator or the accumulator circuit 52 could alternatively be filled by a different hydraulic circuit, without falling beyond the spirit and scope of the present invention. An example of an accumulator for use with the present invention is disclosed in commonly assigned U.S. patent application Ser. No. 12/635,587 filed Dec. 10, 2009, published as 2011-0139285 hereby incorporated by reference as if fully disclosed herein. The accumulator circuit 52 is operable to supply pressurized fluid 44 back to the hydraulic circuit 60. The accumulator, when charged, effectively replaces the pump 50 as the source of pressurized hydraulic fluid 44, thereby eliminating the need for the pump 50 to run continuously.

Figure 3A:
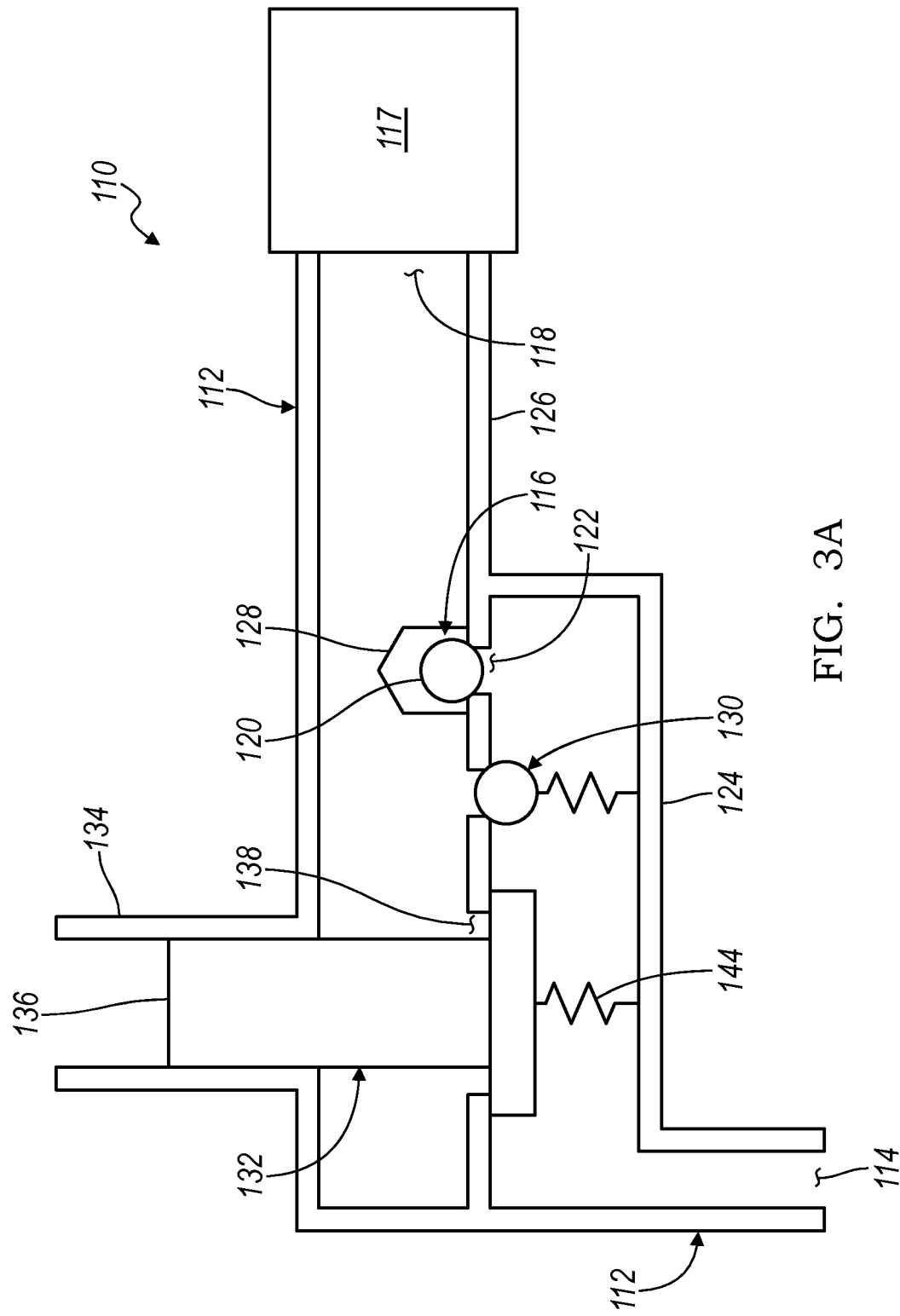
FIG. 3A is a schematic diagram of a variation of a latching clutch control system, according to the principles of the present disclosure.
Figure 3B:
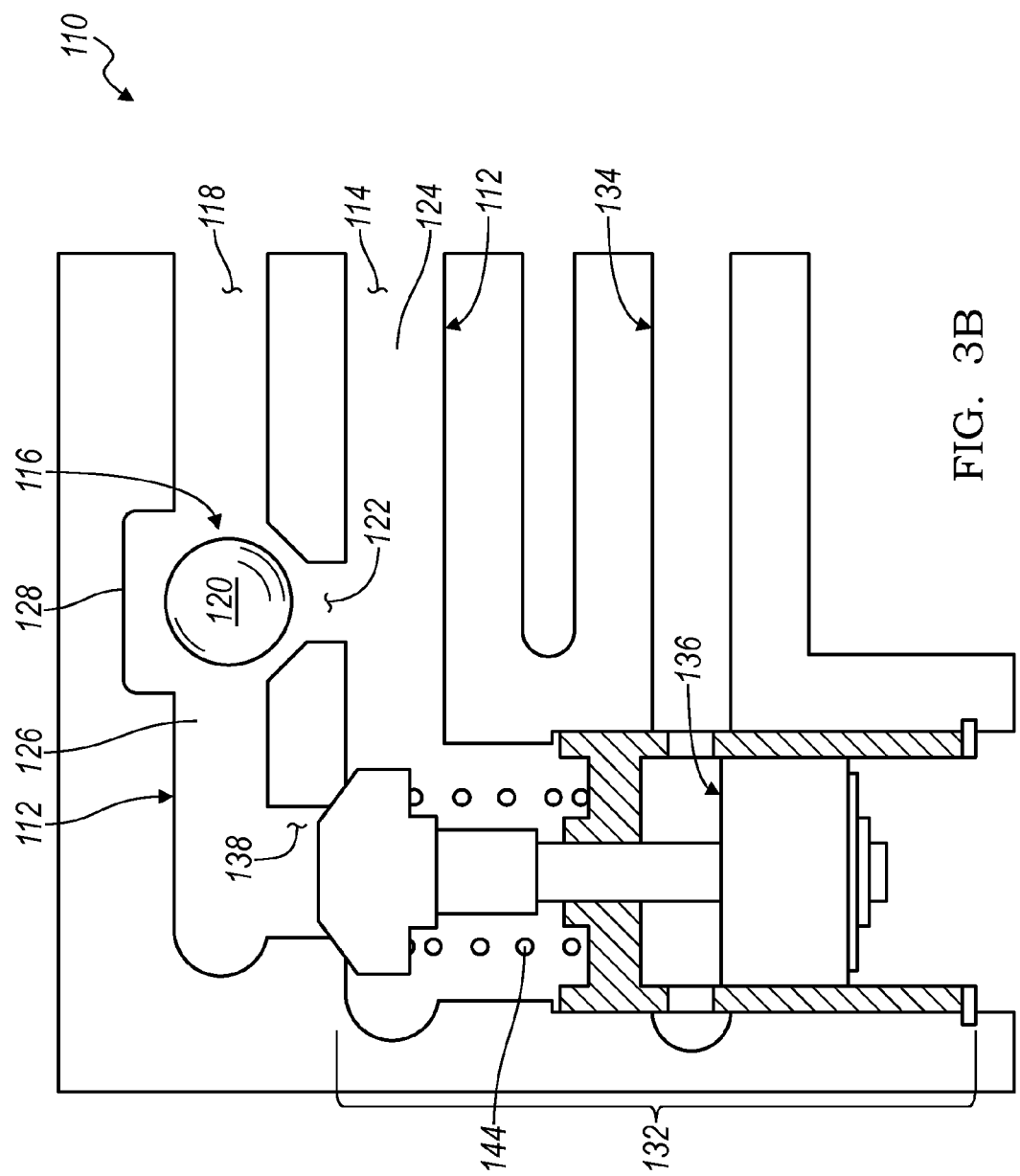
FIG. 3B is a cross-sectional view of one embodiment of the latching clutch control system schematically illustrated in FIG. 3A, in accordance with the principles of the present disclosure.

Referring to FIGS. 3A-3B, an example of a latching clutch control system for use as part of the clutch actuation circuit 48 is illustrated and generally designated at 110. The latching clutch control system 110 includes a clutch feed channel 112. When a torque transmitting device or mechanism 117 (shown schematically in FIG. 3A), such as a clutch or brake, is engaged, hydraulic fluid is fed into an inlet 114 of the clutch feed channel 112 and into an inlet portion 124 of the clutch feed channel 112. If pressure in the inlet portion 124 of the clutch feed channel 112 exceeds pressure in a clutch portion 126 of the clutch feed channel 112, the hydraulic fluid travels from the inlet portion 124, past an inlet valve, which may be a one-way valve 116 such as a ball check-valve, into the clutch portion 126 of the clutch feel channel 112, and into the torque transmitting mechanism 117 through the outlet 118 of the clutch portion 126 of the clutch feed channel 112.

The ball 120 of the one-way valve 116 is illustrated as being seated in FIG. 3A and unseated in FIG. 3B. In other words, in FIG. 3A, the ball 120 is seated across the one-way valve opening 122. When hydraulic pressure in the inlet portion 124 of the clutch feed channel 112 exceeds pressure in the clutch portion 126 of the clutch feed channel 112, the ball 120 unseats from the one-way valve opening 122 (see FIG. 3B). When the ball 120 is unseated, it is prevented from traveling far from the one-way valve opening 122 by a bracket or guide 128.

When fluid pressure in the clutch portion 126 of the clutch feed channel 112 exceeds fluid pressure in the inlet portion 124 of the clutch feed channel 112, the ball 120 seats across the one-way valve opening 122, thus blocking fluid from flowing back from the clutch cavity of the torque transmitting mechanism 117 to the inlet portion 124 and the clutch feed channel inlet 114. After the torque transmitting mechanism 117 is engaged and filled with hydraulic fluid, the one-way valve 116 prevents the hydraulic fluid from draining out of the torque transmitting mechanism 117. Accordingly, the one-way valve 116 is operable to latch hydraulic fluid within the clutch cavity of the torque transmitting mechanism 117. The one-way valve 116 keeps the pressure drop low between the inlet portion 124 and the clutch portion 126 of the clutch feed channel 112 when the torque transmitting mechanism 117 is being applied.

When the motor vehicle 5 stops (i.e., at a red light for example), it may be desirable to shut off the engine 12 in order to improve fuel economy. However, during an automatic engine stop event, the engine 12 is shut down which ordinarily causes a loss of hydraulic fluid 44 pressure in the transmission hydraulic circuit and clutches (see FIG. 1-2). In order to properly control the transmission 14 upon engine re-start and vehicle launch, it is desirable to trap hydraulic fluid in the clutch cavity of the torque transmitting mechanism 117 so that there is no delay with running the transmission 14 upon restart of the engine 12. Accordingly, the one-way valve 116 latches the clutch feed channel 112 to keep fluid in the clutch cavity of the torque transmitting mechanism 117, even when the engine 12 is turned off. Thus, the hydraulic fluid is trapped within the torque transmitting mechanism 117 even when the torque transmitting mechanism 117 is not actively pressurized through the inlet 114 of the clutch feed channel 112.

An optional pressure regulator, such as a blow-off valve 130 (shown schematically in FIG. 3A), is located in parallel with the one-way valve 116, to allow hydraulic fluid in the clutch portion 126 of the clutch feed channel 112 and in the clutch cavity of the torque transmitting mechanism 117 to reduce to a predetermined level after hydraulic fluid is no longer being supplied to the torque transmitting mechanism 117. More particularly, the optional blow-off valve 130 maintains a pressure difference between the inlet portion 124 of the clutch feed channel 112 and the clutch portion 126 of the clutch feed channel 112 when the pressure in the clutch portion 126 exceeds the pressure in the inlet portion 124, but it allows the pressure in the clutch portion 126 to decrease as the pressure in the inlet portion 124 decreases. Thus, if the pressure in the inlet portion 124 is zero or near zero, the blow-off valve 130 maintains the pressure in the clutch portion 126 above zero, but not as high as it would be if the inlet portion 124 has fluid pressure in it. The pressure in the clutch portion 126 is kept at the targeted holding pressure when the pressure in the inlet portion 124 is zero. Accordingly, the blow-off valve 130 allows some hydraulic fluid to drain from the clutch portion 126 of the clutch feed channel 112 and into the inlet portion 124 of the clutch feed channel 112, even when the one-way valve 116 is closed, until the fluid pressure in the clutch portion 126 is reduced to the predetermined level. The excess fluid then drains from the inlet portion 124 back through the inlet 114 and into the main line circuit 60 and the sump 46. When the fluid in the clutch cavity of the torque transmitting mechanism 117 reaches a predetermined lower pressure limit, the blow-off valve 130 closes. The blow-off valve 130 may be a poppet valve, by way of example.

In some situations, however, it may be desirable to unlatch the clutch portion 126 and the clutch cavity of the torque transmitting mechanism 117, and to disengage and drain the torque transmitting mechanism 117. For example, if the vehicle 5 is stopped at a light, but the driver decides to travel in reverse, it may no longer be desirable to have the torque transmitting mechanism 117 engaged. Instead, the torque transmitting mechanism 117 may need to be drained to move in reverse. This would be the case when the torque transmitting mechanism 117 is used for engaging the vehicle 5 in drive, but not in reverse. In other situations, it may be desirable to unlatch the torque transmitting mechanism 117 for faster shift times, or in other scenarios. To unlatch the torque transmitting mechanism 117, a bypass valve 132, which is placed in parallel with the one-way valve 116, is opened.

The bypass valve 132 is normally closed, in this embodiment. The bypass valve 132 may be biased shut by spring 144, which may be a coil spring located within the bypass valve 132 (see FIG. 3B). The bypass valve 132 may be opened in any suitable way, such as by feeding fluid into a control fluid passage 134 or by activating an electromagnet or another signal, by way of example. In FIGS. 3A-3B, the bypass valve 132 is opened by a control fluid that is fed into the control fluid passage 134 to exert pressure on a back side 136 (or any side) of the bypass valve 132. When a predetermined amount of pressure is exerted on the back side 136 of the bypass valve 132 by the fluid in the control fluid passage 136, the bypass valve 132 opens. When the bypass valve 132 is open, hydraulic fluid flows from the torque transmitting mechanism 117 and the clutch portion 126 of the clutch feed channel 112 through the bypass valve opening 138, into the inlet portion 124 of the clutch feed channel 112, and out of the clutch feed channel 112 to the sump 46. The control fluid could come from line pressure in the main line circuit 60, from another clutch feed circuit (for example, the feed to a clutch that is engaged in reverse), or from any other suitable source. The bypass valve 132 could be a poppet valve or any other suitable valve.

In some variations, the bypass valve 132 may also function as a pressure regulator instead of, or in addition to, the blow-off valve 130. Preferably, the bypass valve 132, the blow-off valve 130, and the one-way valve 116 have little (negligible) or no leakage. In other variations, the valves 132, 130, 116 can be configured to leak, but the leak rate is low enough to hold enough pressure for a desired length of time.

The clutch control system 110 embodiment of FIGS. 3A-3B uses a force balance of clutch feed fluid against unlatch or control fluid. Thus, in one embodiment, when clutch fluid is fed through the clutch feed channel 112 to the torque transmitting mechanism 117, the bypass valve 132 will remain closed because the system 110 is designed so that the clutch feed fluid has a higher pressure than the control fluid, which may be line pressure, for example, that is fed to the bypass valve 132 through the control fluid passage 136. If the clutch control fluid feed to channel 134 is off, the bypass valve 132 also remains closed because no fluid force is exerted on its back side 136. However, if the clutch feed fluid is off, but the control fluid through channel 134 is on and exerting force on the back side 136 of the bypass valve 132, the bypass valve 132 opens. This is shown in the following Table 1.

TABLE 1

Operation of Clutch Control System 110.

| Fluid | | | |
| --- | --- | --- | --- |
| Control Fluid in Channel 134 | Clutch Feed Fluid through Inlet 114 | Latch State | Description |
| On | Off | Unlatched | Clutch portion 126 open to drain torque transmitting mechanism 117 |
| On | On | Enabled | Torque transmitting mechanism 117 filled and prepared for use or for engine off |
| Off | Off | Latched | Engine off, holding latch pressure in torque transmitting mechanism 117 |

Figure 4A:
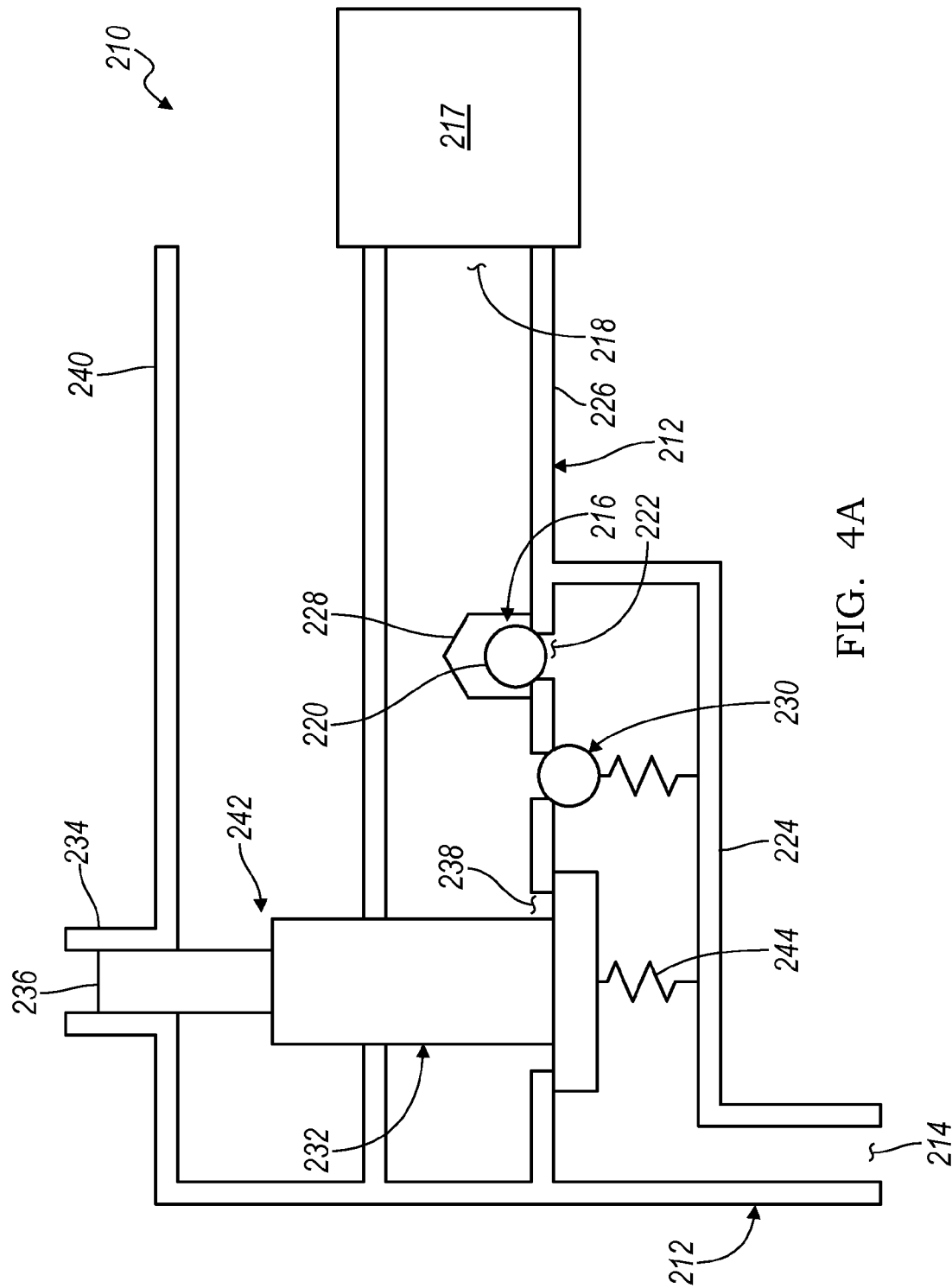
FIG. 4A is a schematic diagram of another variation of a latching clutch control system, in accordance with the principles of the present disclosure.
Figure 4B:
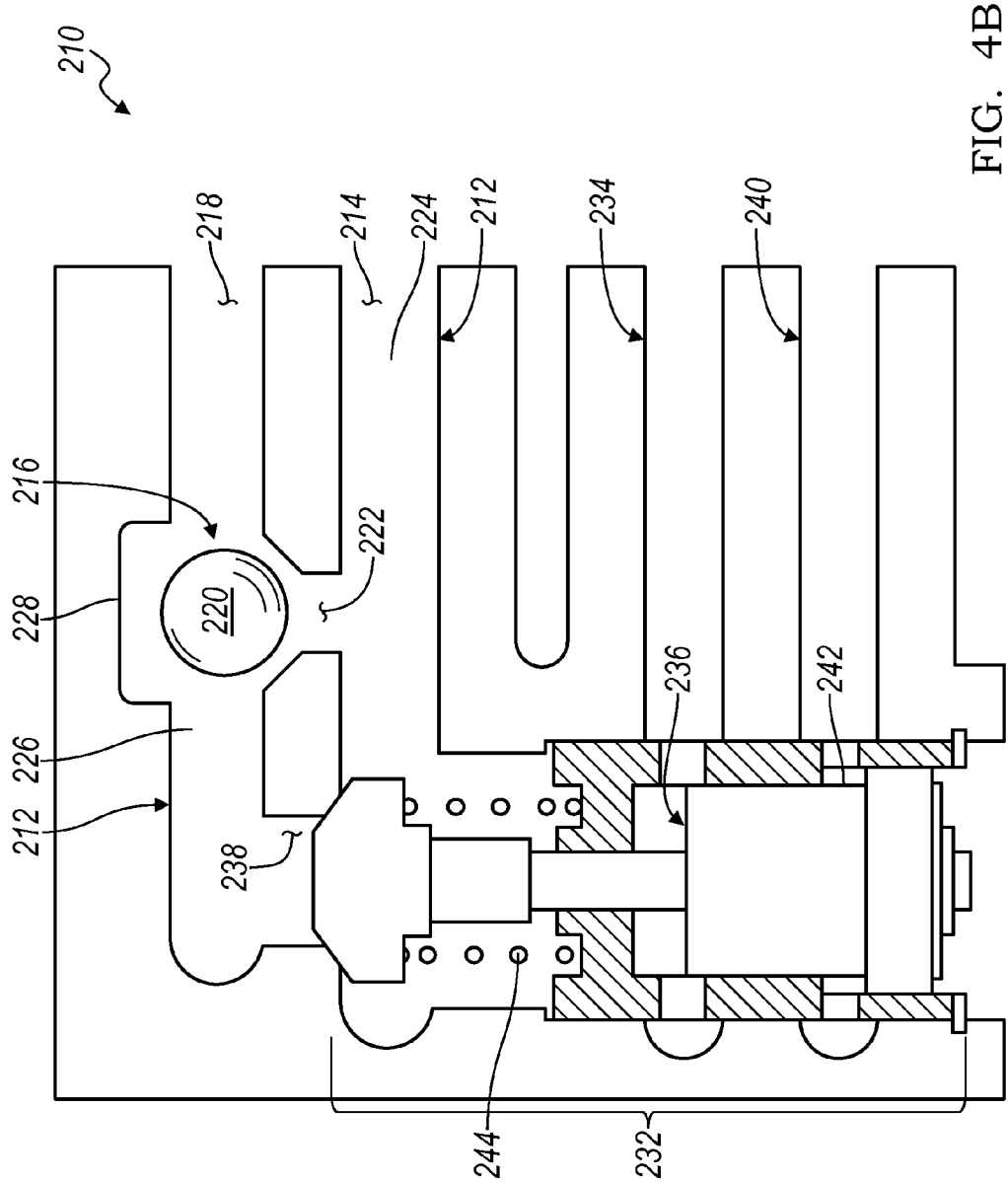
FIG. 4B is a cross-sectional view of one embodiment of the latching clutch control system schematically illustrated in FIG. 4A, in accordance with the principles of the present disclosure.

Referring now to FIGS. 4A-4B, another variation of a latching clutch control system for use as part of the clutch actuation circuit 48 is illustrated and generally designated at 210. Like the latching clutch control system 110 described above, the latching clutch control system 210 includes a clutch feed channel 212, a one-way valve 216 in the form of a ball check-valve, a bypass valve 232, and a torque transmitting mechanism 217 (shown schematically in FIG. 4A). Some variations may also include an optional blow-off valve 230. To engage the torque transmitting mechanism 217, hydraulic fluid is fed into an inlet 214 of the clutch feed channel 212. If pressure in the inlet portion 224 of the clutch feed channel 212 exceeds pressure in the clutch portion 226 of the clutch feed channel 212 (which is typically the case when the torque transmitting mechanism 217 is first engaged), the hydraulic fluid then travels past the one-way valve 216 and into the clutch cavity of the torque transmitting mechanism 217 through the outlet 218 of the clutch portion 226 of the clutch feed channel 212. The one-way valve 216 keeps the pressure drop low between the inlet portion 224 and the clutch portion 226 of the clutch feed channel 212 when the torque transmitting mechanism 217 is being applied.

The ball 220 of the one-way valve 216 is illustrated as being seated in FIG. 4A, wherein the ball 220 is seated across the one-way valve opening 222, and unseated in FIG. 4B. When hydraulic pressure in the inlet portion 224 of the clutch feed channel 212 exceeds pressure in the clutch portion 226 of the clutch feed channel 212, the ball 220 unseats from the one-way valve opening 222. When the ball 220 is unseated, it is prevented from traveling far from the one-way valve opening 222 by a bracket or guide 228. When the one-way valve 216 is open (e.g., the ball 220 is unseated), clutch feed fluid travels enters the clutch portion 226 and the cavity of the torque transmitting device 217.

When the fluid pressure in the clutch portion 226 of the clutch feed channel 212 exceeds the fluid pressure in the inlet portion 224 of the clutch feed channel 212, the ball 220 seats across the one-way valve opening 222, thus blocking fluid from flowing back from the torque transmitting mechanism 217 to the inlet portion 224 and the clutch feed inlet 214. After the torque transmitting mechanism 217 is engaged and filled with hydraulic fluid, the one-way valve 216 prevents the hydraulic fluid from draining out of the torque transmitting mechanism 217. Accordingly, the one-way valve 216 is operable to latch hydraulic fluid within the torque transmitting mechanism 217. The blow-off valve 230 operates the same as the blow-off valve 130 described above.

As described above, there may be situations when it is desirable to drain the torque transmitting mechanism 217 after it is latched by the one-way valve 216 when the torque transmitting mechanism 217 is not being fed fluid through the clutch feed passage 212. To unlatch the torque transmitting mechanism 217, the bypass valve 232 is opened.

The bypass valve 232 is located in parallel with the one-way valve 216. The bypass valve 232 is normally closed, in this embodiment. The bypass valve 232 may be biased shut by a spring 244, such as a coil spring located within the bypass valve 232 (see FIG. 4B). The bypass valve 232 may be opened in any suitable way, such as by pressure in a first control fluid passage 234, pressure in a second control fluid passage 240, an electromagnet, or another signal, by way of example. In FIGS. 4A-4B, the bypass valve 232 may be opened by way of one or both of the first and second control fluid passages 234, 240. To open the bypass valve 232 via the first control fluid passage 234, control fluid is fed into the first control fluid passage 234 to place pressure on a back side 236 (or other side) of the bypass valve 232. To open the bypass valve 232 via the second control fluid passage 240, control fluid is fed into the second control fluid passage 240 to place pressure on a rearward side 242 (or other side) of the bypass valve 232.

When a predetermined amount of pressure is exerted on the back side 236 of the bypass valve 232 by fluid in the first control fluid passage 236 and/or the rearward side 242 of the bypass valve 232 by fluid in the second control fluid passage 240, the bypass valve 232 opens. When the bypass valve 232 is open, hydraulic fluid flows from the torque transmitting mechanism 217 and the clutch portion 226 of the clutch feed channel 212 through the bypass valve opening 238, into the inlet portion 224 of the clutch feed channel 212, and out of the clutch feed channel 212 to the sump 46.

The control fluid for either control fluid passage 234, 240 could come from line pressure in the main line circuit 60, from another clutch feed circuit (for example, the feed to a clutch that is engaged in reverse), or from any other suitable source. In one variation, fluid is fed to the first control fluid passage 234 from a first clutch feed line and to the second control fluid passage 240 from a second clutch feed line. For example, a feed line that activates a reverse clutch could also feed the first fluid control passage 234, and a feed line that activates a higher gear clutch could feed the second fluid control passage 240. In one embodiment, a clutch that is engaged in reverse, third gear, and fifth gear is in fluid communication with the first control fluid passage 234, and a clutch that is engaged in fourth gear, fifth gear, and sixth gear is in fluid communication with the second control fluid passage 240.

The bypass valve 232 could be a poppet valve or any other suitable valve. In some variations, the bypass valve 232 may also function as a pressure regulator instead of, or in addition to, the blow-off valve 230. Preferably, the bypass valve 232, the blow-off valve 230, and the one-way valve 216 have little (negligible) or no leakage.

The latching clutch control system 210 embodiment of FIGS. 4A-4B may use a force balance of clutch feed fluid against unlatch or control fluids. Thus, when clutch fluid is fed through the clutch feed channel 212 to the torque transmitting mechanism 217, the bypass valve 216 will remain closed if the system 210 is designed so that the clutch feed fluid has a higher pressure than the control fluid(s) that are fed to the bypass valve 232 through one or both control fluid passages 234, 240. In the alternative, the clutch control system 210 could be configured to require no force balance and simply to remain normally latched unless the control fluid(s) open the bypass valve 232 against the spring force 244. An example of the operation of the clutch control system 210 is shown in the following Table 2.

TABLE 2

Operation of Clutch Control System 210.

| Fluid | | | | |
|---|---|---|---|---|
| First Control Fluid in Channel 234 (Clutch Feed for $3^{rd}$, $5^{th}$, and Reverse Gears) | Second Control Fluid in Channel 240 (Clutch Feed for $4^{th}$, $5^{th}$, and $6^{th}$ Gears) | Clutch Feed Fluid for Torque Transmitting Mechanism 217, through Inlet 214 (Feed for $1^{st}$, $2^{nd}$, $3^{rd}$, and $4^{th}$ Gears) | Latch State | Description |
| Off | Off | Off | Latched | Neutral or Engine Off |
| Off | Off | On | Enabled | Torque transmitting mechanism 217 filled and prepared for use in first and second gears or engine off |
| Off | On | Off | Unlatched | $6^{th}$ Gear |
| Off | On | On | Unlatched | $4^{th}$ Gear |
| On | Off | Off | Unlatched | Reverse |
| On | Off | On | Unlatched | $3^{rd}$ Gear |
| On | On | Off | Unlatched | $5^{th}$ Gear |
| On | On | On | Unlatched | No such state |

Figure 5A:
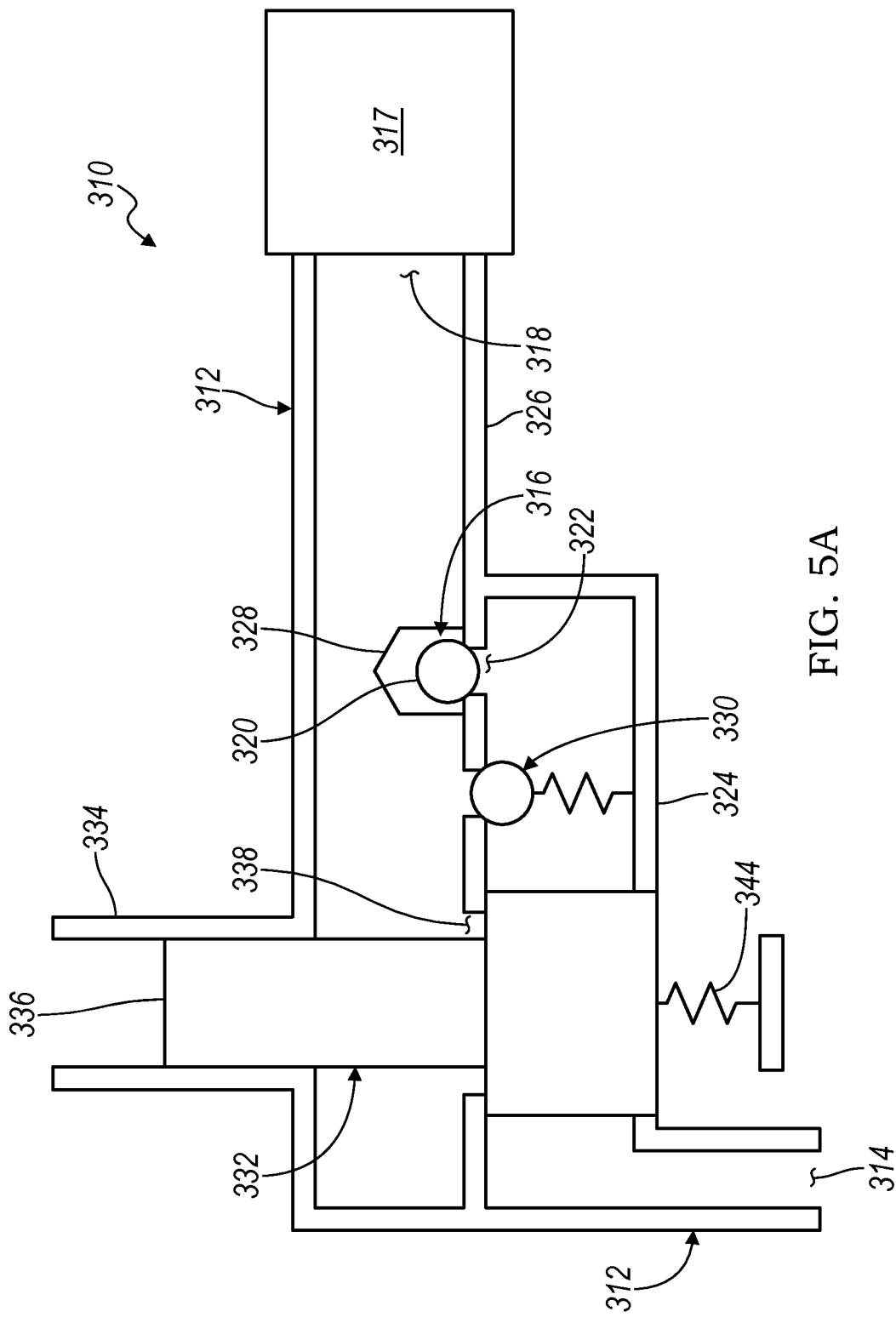
FIG. 5A is a schematic diagram of yet another variation of a latching clutch control system, according to the principles of the present disclosure.
Figure 5B:
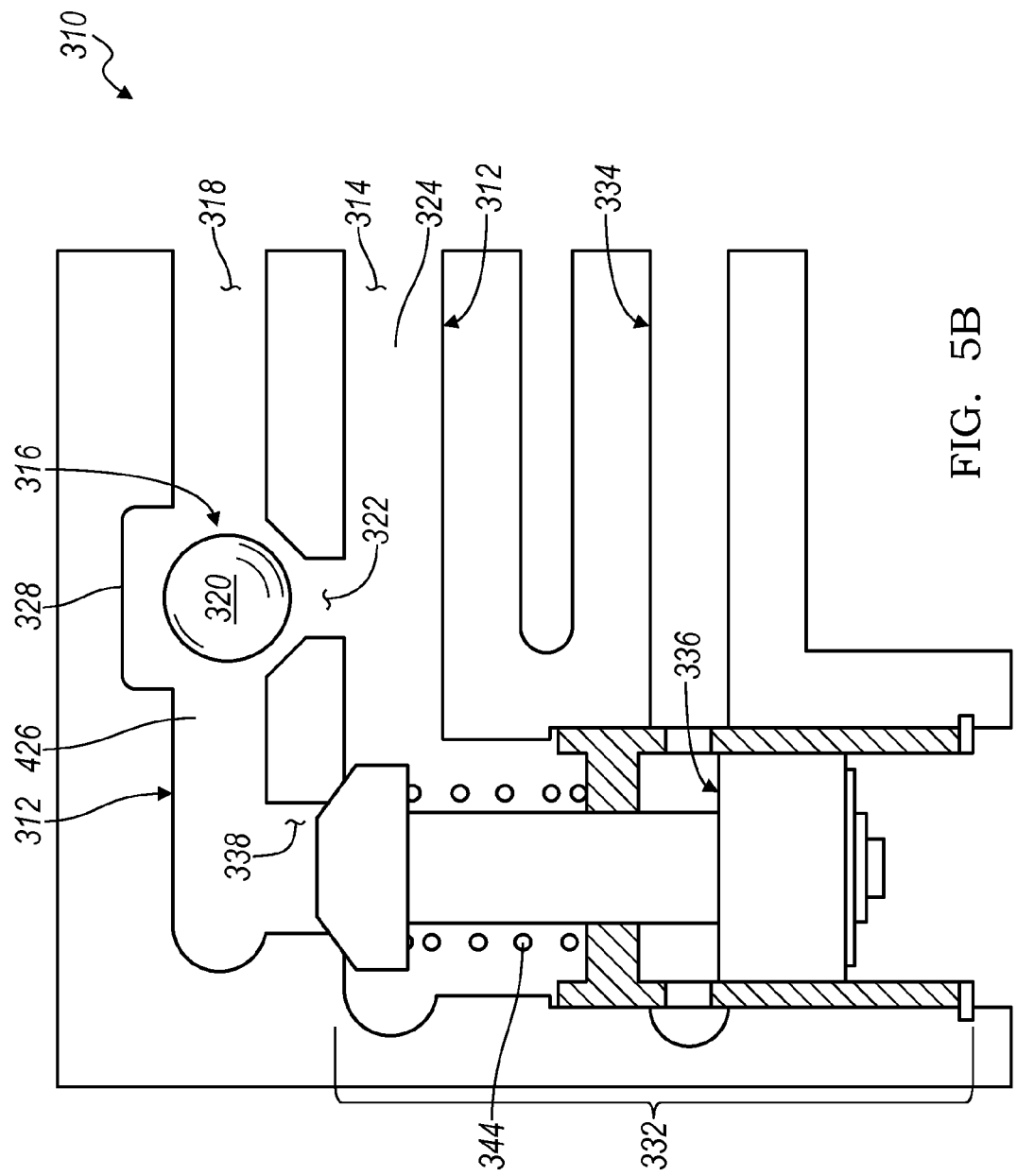
FIG. 5B is a cross-sectional view of one embodiment of the latching clutch control system schematically illustrated in FIG. 5A, in accordance with the principles of the present disclosure.

Referring now to FIGS. 5A-5B, yet another variation of a latching clutch control system for use as part of the clutch actuation circuit 48 is illustrated and generally designated at 310. Like the latching clutch control systems 110, 210 described above, the latching clutch control system 310 includes a clutch feed channel 312, a one-way valve 316 in the form of a ball check-valve, a bypass valve 332, and a torque transmitting mechanism 317 (illustrated schematically in FIG. 5A). Some variations may also include an optional blow-off valve 330.

To engage the torque transmitting mechanism 317, hydraulic fluid is fed into an inlet 314 of the clutch feed channel 312. If pressure in the inlet portion 324 of the clutch feed channel 312 exceeds pressure in the clutch portion 326 of the clutch feed channel 312, the hydraulic fluid then travels past the one-way valve 316 and into the torque transmitting mechanism 317 through the outlet 318 of the clutch portion 326 of the clutch feed channel 312. The one-way valve 316 keeps the pressure drop low between the inlet portion 324 and the clutch portion 326 of the clutch feed channel 312 when the torque transmitting mechanism 317 is being applied.

Like the one-way valves 116, 216 described above, the one-way valve 316 in FIGS. 5A-5B includes a ball 320 that seats across the one-way valve opening 322. When hydraulic pressure in the inlet portion 324 of the clutch feed channel 312 exceeds pressure in the clutch portion 326 of the clutch feed channel 312, the ball 320 unseats from the one-way valve opening 322. When the ball 320 is unseated, it is prevented from traveling far from the one-way valve opening 322 by bracket or guide 328.

When the fluid pressure in the clutch portion 326 of the clutch feed channel 312 exceeds the fluid pressure in the inlet portion 324 of the clutch feed channel 312, the ball 320 seats across the one-way valve opening 322, thus blocking fluid from flowing back from the torque transmitting mechanism 317 to the inlet portion 324 and the clutch feed inlet 314. After the torque transmitting mechanism 317 is engaged and filled with hydraulic fluid, the one-way valve 316 prevents the hydraulic fluid from draining out of the clutch 317. Accordingly, the one-way valve 316 is operable to latch hydraulic fluid within the torque transmitting mechanism 317. The blow-off valve 330 operates the same as the blow-off valves 130, 230 described above.

As described above, there may be situations when it is desirable to drain the torque transmitting mechanism 317 after it is latched by the one-way valve 316 when the torque transmitting mechanism 317 is not being fed fluid through the clutch feed passage 312. To unlatch the torque transmitting mechanism 317, the bypass valve 332 is opened.

The bypass valve 332 is placed in parallel with the one-way valve 316. The bypass valve 332 is normally closed, in this embodiment. The bypass valve 332 may be opened in any suitable way, such as by pressure in one or more control fluid passages 334, an electromagnet, or another signal, by way of example. In FIGS. 5A-5B, the bypass valve 332 may be opened by way of the control fluid passage 334. To open the bypass valve 332, control fluid is fed into the control fluid passage 334 to place pressure on a back side 336 of the bypass valve 332. When a predetermined amount of pressure is exerted on the back side 336 of the bypass valve 332 by fluid in the control fluid passage 334, the bypass valve 332 opens. When the bypass valve 332 is open, hydraulic fluid flows from the torque transmitting mechanism 317 and the clutch portion 326 of the clutch feed channel 312 through the bypass valve opening 338, into the inlet portion 324 of the clutch feed channel 312 and out of the clutch feed channel 312 to the sump 46.

The control fluid for the control fluid passage 334 could come from line pressure in the main line circuit 60, from another clutch feed circuit (for example, the feed to a clutch that is engaged in reverse), or from any other suitable source. For example, a feed line that activates a reverse clutch could also feed the control fluid passage 334. The bypass valve 332 could be a poppet valve or any other suitable valve. In some variations, the bypass valve 332 may also function as a pressure regulator instead of, or in addition to, the blow-off valve 330. Preferably, the bypass valve 332, the blow-off valve 330, and the one-way valve 316 have little (negligible) or no leakage.

The bypass valve 332 of the clutch control system 310 embodiment of FIGS. 5A-5B can be designed such that it requires no hydraulic pressure balance. The bypass valve 332 remains closed until the control fluid pressure fed into the control pressure line 334 is high enough to overcome the spring 344.

Figure 6A:
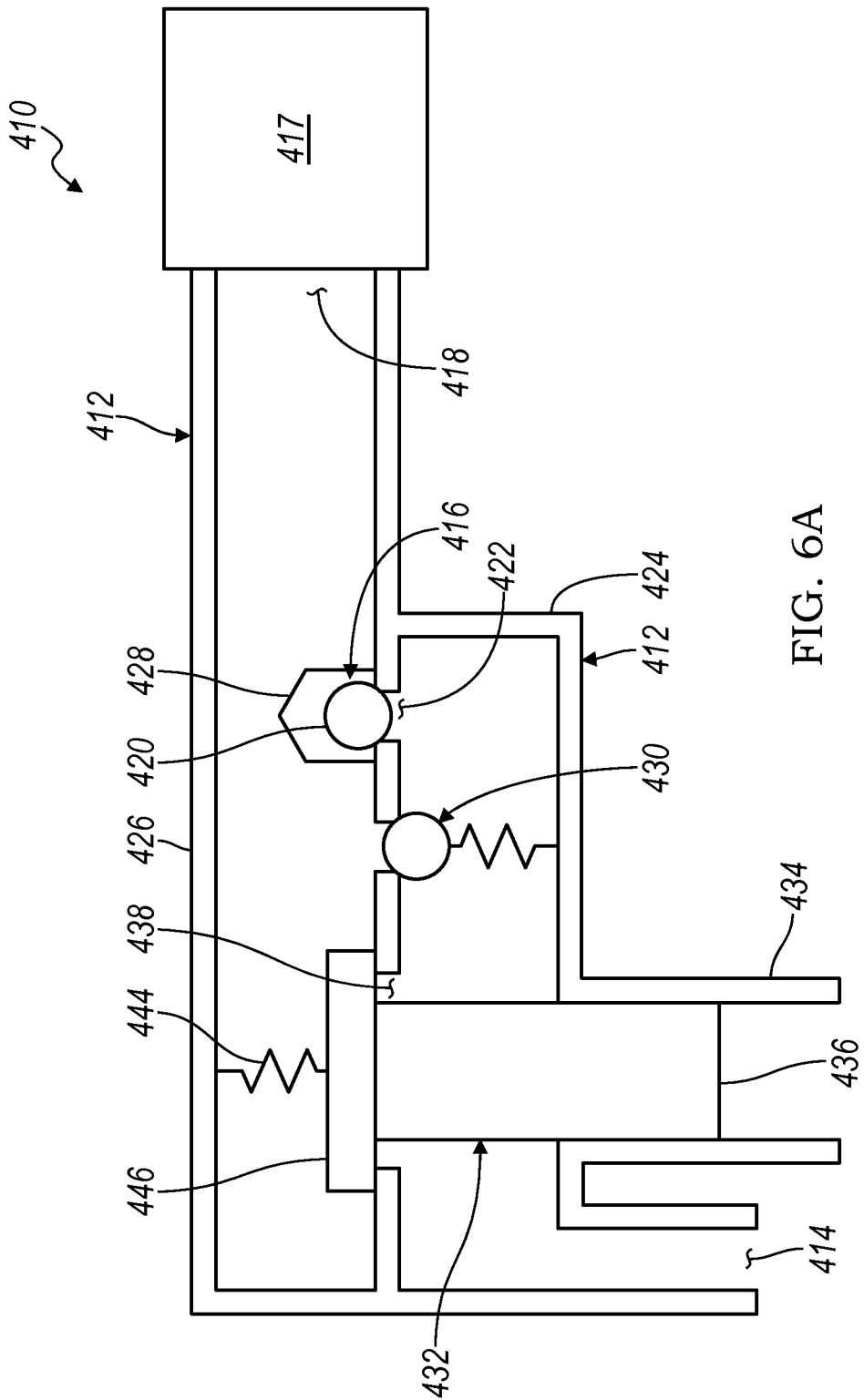
FIG. 6A is a schematic diagram of still another variation of a latching clutch control system, in accordance with the principles of the present disclosure.
Figure 6B:
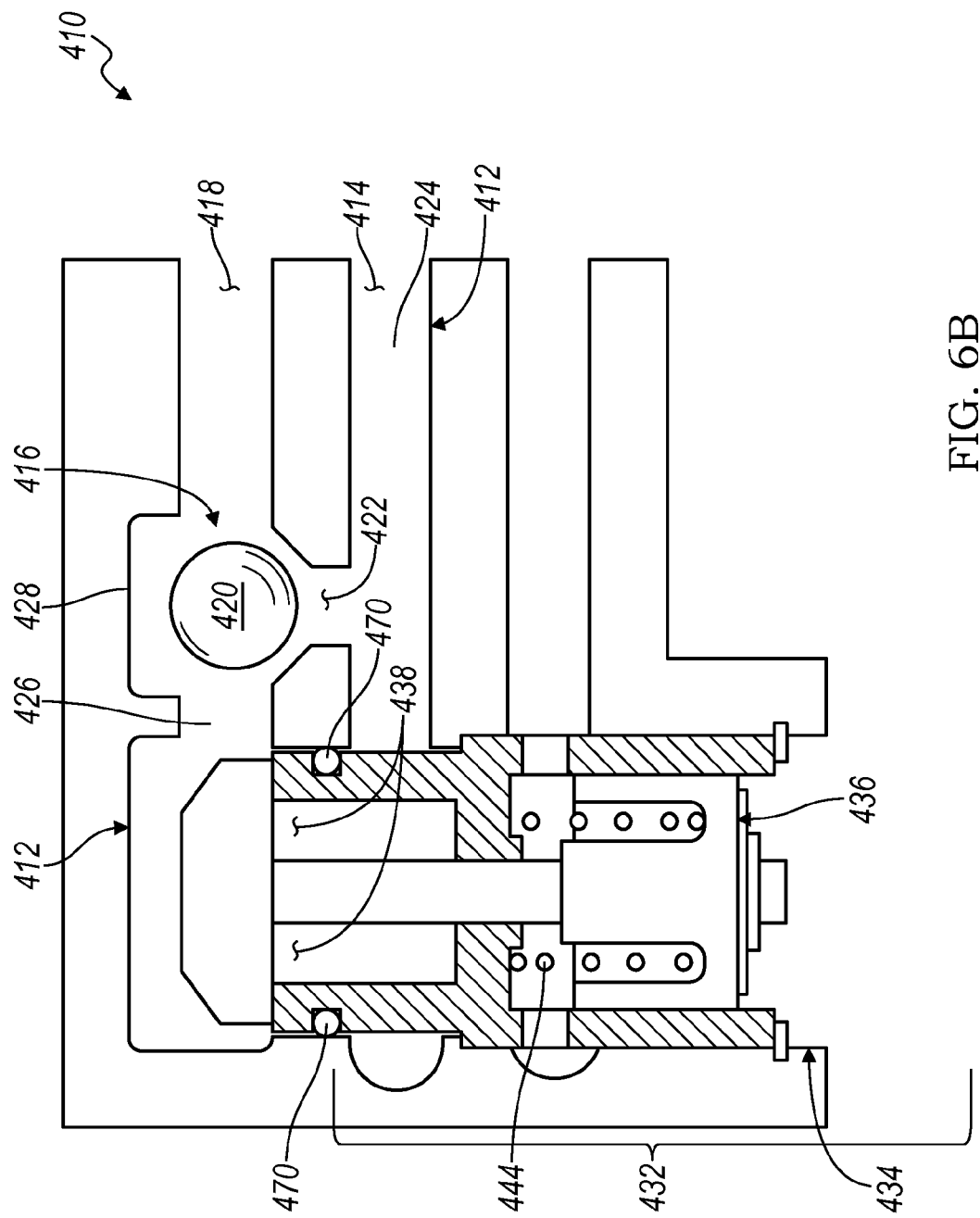
FIG. 6B is a cross-sectional view of one embodiment of the latching clutch control system schematically illustrated in FIG. 6A, in accordance with the principles of the present disclosure.

Referring now to FIGS. 6A-6B, still another variation of a latching clutch control system for use as part of the clutch actuation circuit 48 is illustrated and generally designated at 410. The latching clutch control system 410 includes a clutch feed channel 412, a latch valve 432, and a torque transmitting mechanism 417 (illustrated schematically in FIG. 6A). Some variations may also include an optional blow-off valve 430.

To engage the torque transmitting mechanism 417, hydraulic fluid is fed into an inlet 414 of the clutch feed channel 412. If pressure in the inlet portion 424 of the clutch feed channel 412 exceeds pressure in the clutch portion 426 of the clutch feed channel 412, the fluid pressure in the inlet portion 424 of the clutch feed channel 412 pushes open the latch valve 432 and fills the torque transmitting mechanism 417. The latch valve 432 may slide within the clutch feed channel 412 on one or more bearings 470. An optional one-way valve 416 may also be placed in parallel with the latch valve 432 to the fill the torque transmitting mechanism 417 when the torque transmitting mechanism 417 is engaged. If a one-way valve 416 is included, it may have a ball 420, a one-way valve opening 422, and a guide 428, as described above. The one-way valve 416 keeps the pressure drop low between the inlet portion 424 and the clutch portion 426 of the clutch feed channel 412 when the torque transmitting mechanism 417 is being applied.

When the torque transmitting mechanism 417 is being fed through openings 438 in the latch valve 432, the hydraulic fluid travels from the clutch feed inlet 414 into the inlet portion 424 of the clutch feed passage 412, through the openings 438 of latch valve (and through the one-way valve opening 422 if the one-way valve 416 is included), into the clutch portion 426 of the clutch feed passage 412, and into the torque transmitting mechanism 417 through the outlet 418 of the clutch portion 426 of the clutch feed channel 412.

When the fluid pressure in the clutch portion 426 of the clutch feed channel 412 exceeds the fluid pressure in the inlet portion 424 of the clutch feed channel 412, the latch valve 432 is pushed shut by fluid pressure acting on the clutch side 426 of the latch valve 432. The ball 420 also seats across the one-way valve opening 422, thus blocking fluid from flowing back from the torque transmitting mechanism 417 to the inlet portion 424 and the clutch feed inlet 414. After the torque transmitting mechanism 417 is engaged and filled with hydraulic fluid, the latch valve 432 (along with the one-way valve 416, if included) prevent the hydraulic fluid from draining out of the torque transmitting mechanism 417. Accordingly, the latch valve 432 (and the one-way valve 416, if included) is operable to latch hydraulic fluid within the clutch cavity of the torque transmitting mechanism 417. The blow-off valve 430 operates the same as the blow-off valves 130, 230, 330 described above.

As described above, there may be situations when it is desirable to drain the torque transmitting mechanism 417 after it is latched when the torque transmitting mechanism 417 is not being fed fluid through the clutch feed passage 412 from fluid flowing through the clutch feed inlet 414. To unlatch the torque transmitting mechanism 417, the latch valve 432 is opened.

The latch valve 432 is normally kept closed by the spring 444, and when the torque transmitting mechanism 417 is filled, additionally by the hydraulic fluid in the clutch cavity of the torque transmitting mechanism 417 and the clutch portion 426 of the clutch feed channel 412. The latch valve 432 may be opened in any suitable way, such as by fluid pressure in one or more control fluid passages 434, an electromagnet, or another signal, by way of example. In FIGS. 6A-6B, the latch valve 432 may be opened by feeding fluid into the control fluid passage 434. To open the latch valve 432, control fluid is fed into the control fluid passage 434 to place pressure on a back side 436 of the latch valve 432. When a predetermined amount of pressure is exerted on the back side 436 of the latch valve 432 by fluid in the control fluid passage 434, the latch valve 432 opens. When the latch valve 432 is open, hydraulic fluid flows from the clutch cavity of the torque transmitting mechanism 417 and the clutch portion 426 of the clutch feed channel 412 through the latch valve openings 438, into the inlet portion 424 of the clutch feed channel 412, and out of the clutch feed channel 412 through the inlet 414, to the sump 46.

The control fluid for the control fluid passage 434 could come from line pressure in the main line circuit 60, from another clutch feed circuit (for example, the feed to a clutch that is engaged in reverse), or from any other suitable source. For example, a feed line that activates a reverse clutch or a higher gear clutch could also feed the control fluid passage 434. The latch valve 432 could be a poppet valve or any other suitable valve. Preferably, the latch valve 432, the blow-off valve 430, and the one-way valve 416 have little (negligible) or no leakage.

The latching clutch control system 410 embodiment of FIGS. 6A-6B may use a force balance of clutch cavity pressure and/or spring force against unlatch or control fluid and/or clutch feed fluid. Thus, when clutch fluid is fed through the clutch feed channel 412 to the torque transmitting mechanism 417, or when control fluid is fed into the control fluid passage 434, the latch valve 432 will remain closed until the clutch feed fluid flowing into the inlet 414 of the clutch feed channel 412 and/or the control fluid in the control fluid passage 434 exceeds the pressure of fluid in the clutch portion 426 of the clutch feed channel 412 and the force of the spring 444. In the alternative, the clutch control system 410 could be configured to require no force balance and simply to remain normally latched unless the pressure of the control fluid(s) and/or the clutch feed fluid overcomes the force in the spring 444 and opens the latch valve 432.

Figure 7:
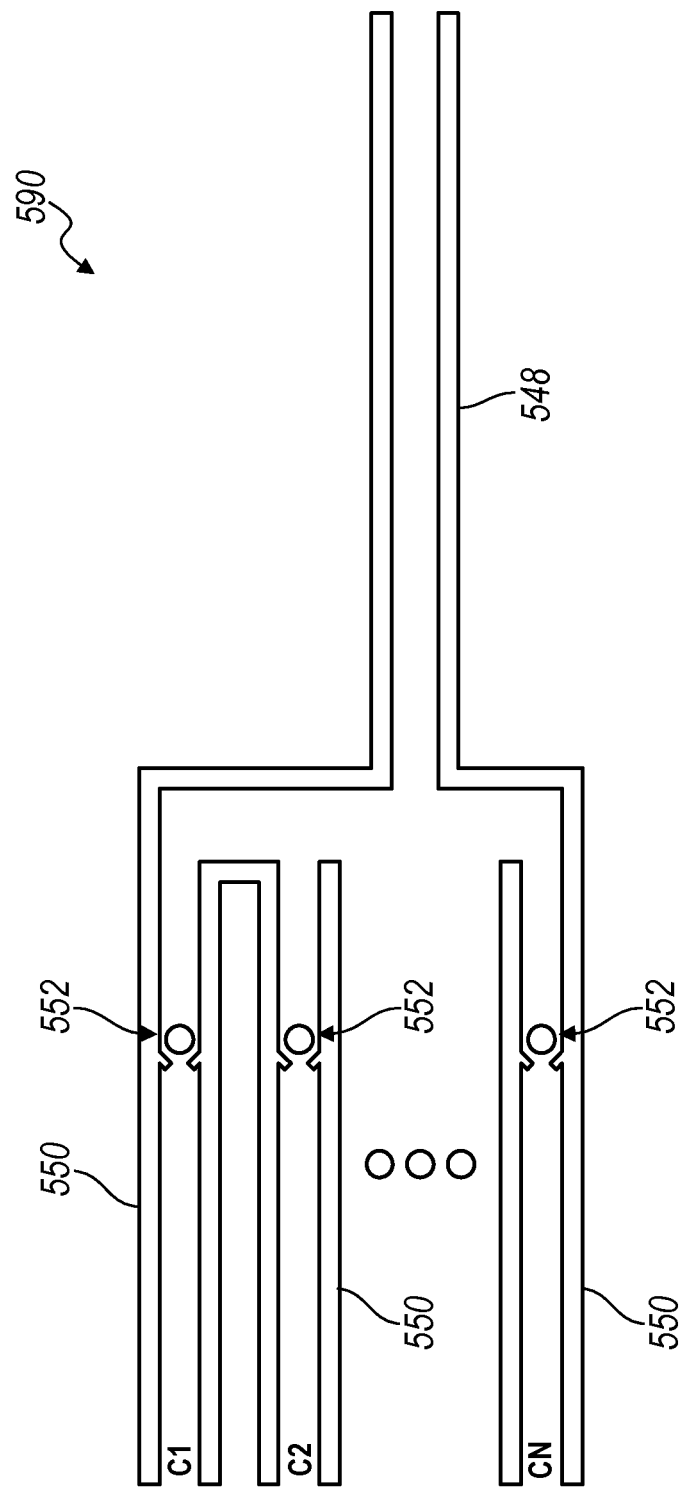
FIG. 7 is a schematic diagram of a variation of a control fluid circuit, in accordance with the principles of the present disclosure.

Referring now to FIG. 7, a control fluid circuit 590 is illustrated. The control fluid circuit 590 may be connected to any of the control fluid passages 134, 234, 240, 334, 434 hereinbefore described, which are used to open the bypass valve 132, 232, 332 or latch valve 432, respectively. Any number of clutches C1, C2, . . . CN may be hydraulically linked to a single feed channel 548, wherein the feed channel 548 is in fluid communication with one or more of the control fluid passages 134, 234, 240, 334, 434. The math convention C1, C2, . . . CN denotes that the control fluid circuit 590 could have any number of clutches providing control fluid passages. If any of the clutches C1, C2, . . . CN is turned on or engaged, such that hydraulic fluid flows through them, the hydraulic fluid from the respective clutch C1, C2, . . . CN will provide fluid through the feed channel 548 and into the connected control fluid channel 134, 234, 240, 334, and/or 434. Each clutch C1, C2, . . . CN has a clutch channel 550 in fluid communication with the feed channel 548. Each clutch channel 550 has a one-way valve 552, such as a ball check-valve, that allows fluid to flow from the clutch C1, C2, . . . CN to the feed channel 548 but not in the reverse direction. The control fluid circuit 590 thus controls the bypass valve 132, 232, 332 or latch valve 432 with any clutch C1, C2, . . . CN that is included as part of the control fluid circuit 590.

Figure 8:
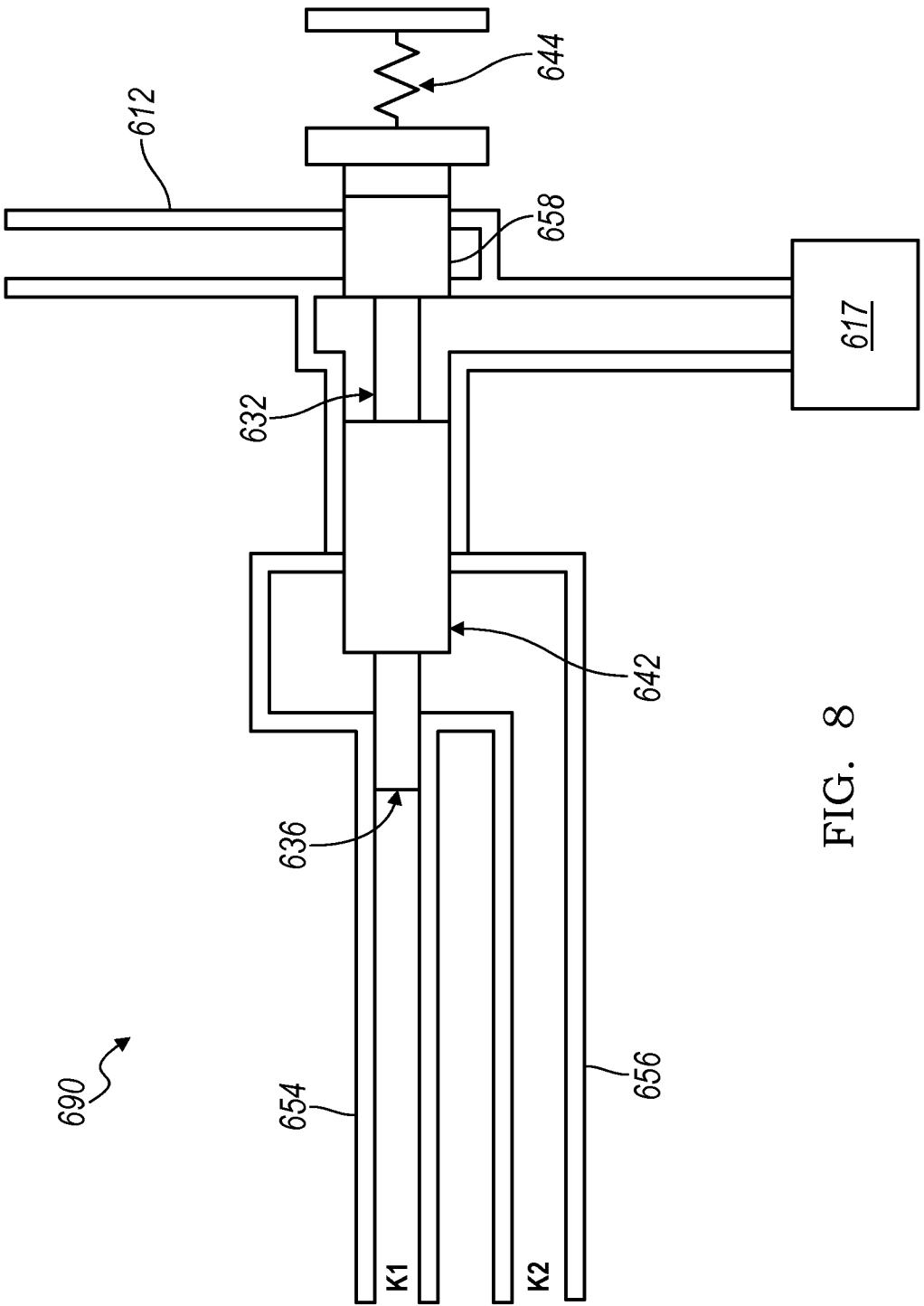
FIG. 8 is a schematic diagram of another variation of a control fluid circuit, according to the principles of the present disclosure.

With reference to FIG. 8, another control fluid circuit 690 is illustrated. The control fluid circuit 690 may be fluidly connected to any of the control fluid passages 134, 234, 240, 334, 434 hereinbefore described, which are used to open the bypass valve 132, 232, 332 or latch valve 432, which is designated as latch valve 632 in this embodiment. Any number of clutches, such as two clutches K1, K2, may be turned on or engaged to cause the latch valve 632 to open.

More particularly, if a first clutch K1 is engaged, fluid from the first clutch K1 enters a first clutch channel 654, and pressure from the fluid exerts a force on the back side 636 of the latch valve 632 and moves the latch valve 632 along the first clutch channel 654 in the rightward direction in the orientation of FIG. 8. If a second clutch K2 is engaged, fluid from the second clutch K2 enters a second clutch channel 656, and pressure from the fluid exerts a force on the rearward side 642 of the latch valve 632 and moves the latch valve 632 along the second clutch channel 656 in the rightward direction in the orientation of FIG. 8.

Either or both of the clutches K1, K2 or additional clutches (not shown) may be engaged to move the latch valve 632. For example, the control fluid circuit 690 could have any number of clutches K1, K2, . . . KN, like the control fluid circuit 590 of FIG. 8. In some variations, both clutches K1, K2 (or other control fluid lines) could be required to be filled to move the latch valve 632. Once the latch valve 632 is moved by fluid pressure from one or both of the clutches K1, K2, which happens when the fluid pressure in one or more of the clutch channels 654, 656 exerts a force on the latch valve 632 that exceeds the spring 644 force, a blocking portion 658 of the clutch valve 632 moves to allow fluid to travel freely from the latched torque transmitting mechanism 617 to the clutch feed passage 612. A blow-off valve and/or a one-way valve may also be included, if desired (not shown). The clutch control circuit 690 may be used independently or with one of the latching clutch control systems 110, 210, 310, 410 hereinbefore described.

The latching clutch control systems 110, 210, 310, 410 and the clutch control circuits 590, 690 can be implemented into transmissions with a variety of speeds, such as, for example, transmissions with four, five, six, seven, eight, nine, ten, eleven, twelve, or more forward speeds (both rear-wheel and front-wheel drive).

Figure 9:
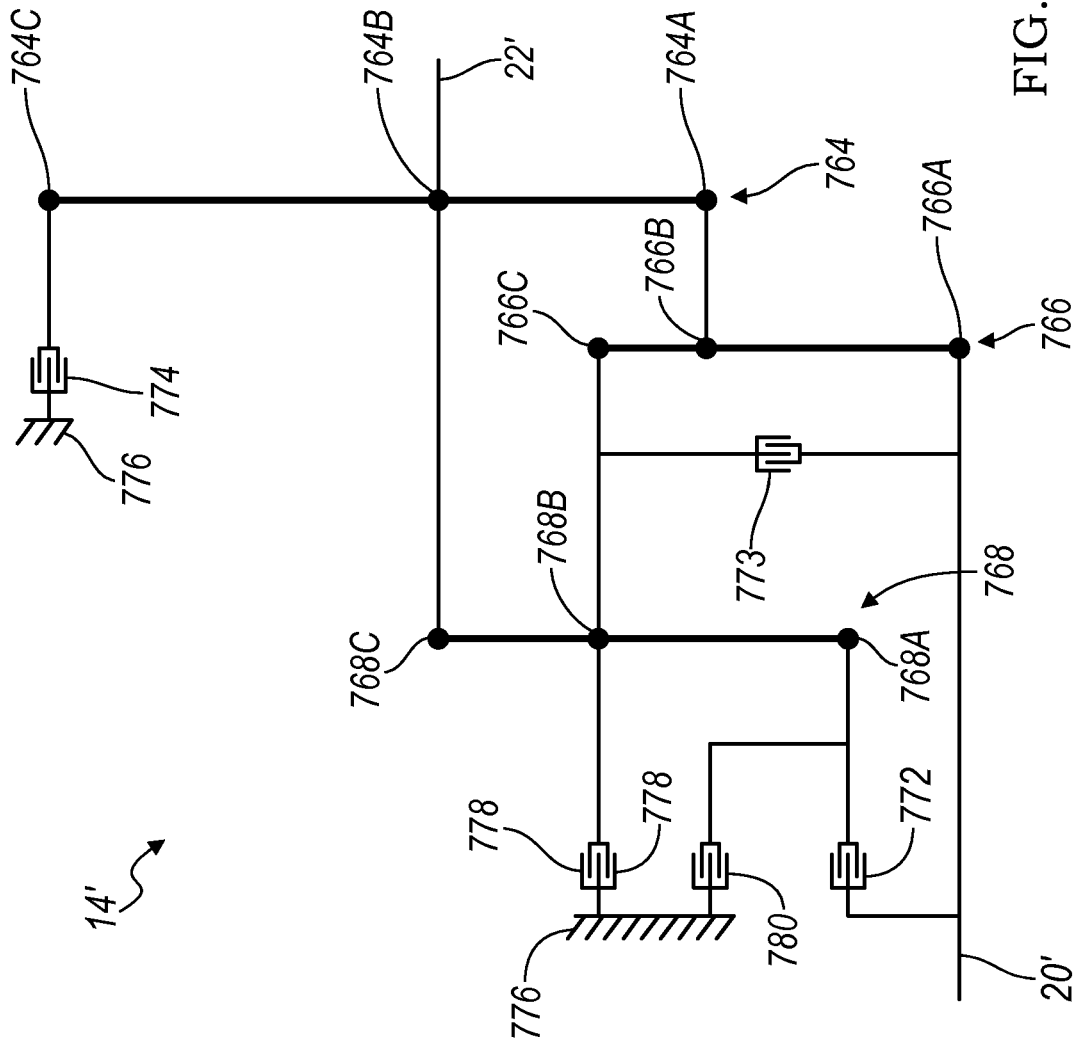
FIG. 9 is a lever diagram of an example of a transmission in accordance with the present disclosure.

Referring now to FIG. 9, a lever of a transmission having one or more of the latching clutch control systems 110, 210, 310, 410 and/or clutch control circuits 590, 690 is illustrated and generally designated at 14'. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on each of two different levers are interconnected through a fixed connection they may be represented as a single node on a single lever. The relative length between the nodes of each lever can be used to represent the ring-to-sun diameter or tooth count ratio of each respective gear set. These lever ratios, in turn, are used to vary the gear ratios of the transmission in order to achieve an appropriate ratio and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 14' includes an input shaft or member 20', a first planetary gear set 764, a second planetary gear set 766, a third planetary gear set 768, and an output shaft or member 22'. One or more additional planetary gear sets could also be included, if desired. In the lever diagram of FIG. 9, the first planetary gear set 764 has three nodes: a first node 764A, a second node 764B, and a third node 764C. The second planetary gear set 766 has three nodes: a first node 766A, a second node 766B, and a third node 766C. The third planetary gear set 768 has three nodes: a first node 768A, a second node 768B, and a third node 768C.

The input member or shaft 20' is continuously coupled to the first node 766A of the second planetary gear set 766. The output member 22' is continuously coupled to the third node 768C of the third planetary gear set 768 and the second node 764B of the first planetary gear set 764. The first node 764A of the first planetary gear set 764 is continuously coupled to the second node 766B of the second planetary gear set 766. The second node 764B of the first planetary gear set 764 is continuously coupled to the third node 768C of the third planetary gear set 768. The third node 766C of the second planetary gear set 766 is continuously coupled to the second node 768B of the third planetary gear set 768.

A first clutch 772 selectively connects the input member or shaft 20' and the first node 766A of the second planetary gear set 766 with the first node 768A of the third planetary gear set 768. A second clutch 773 selectively connects the input member or shaft 20' and the first node 766A of the second planetary gear set 766 with the second node 768B of the third planetary gear set 768 and the third node 766C of the second planetary gear set 766. A first brake 774 selectively connects the third node 764C of the first planetary gear set 764 with a stationary member or transmission housing 776. A second brake 778 selectively connects the third node 766C of the second planetary gear set 766 and the second node 768B of the third planetary gear set 768 with the stationary member or transmission housing 776. A third brake 780 selectively connects the first node 768A of the third planetary gear set 768 with the stationary member or transmission housing 776. The torque-transmitting mechanisms (the clutches 772, 773 and brakes 774, 778, 780) allow for selective interconnection of shafts or interconnecting members, members of the planetary gear sets and the housing.

The transmission 14' of FIG. 9 includes one of the latching fluid control systems 110, 210, 310, 410 or clutch control systems 590, 690 described above. For example, when a vehicle 5 comes to a stop at a light, the vehicle 5 is in first gear and the first brake 774 is engaged. If the engine is turned off, however, the hydraulic fluid in the clutch cavity of the first brake 774 would drain out if not latched. Accordingly, the first brake 774 is operable as the torque transmitting mechanism 117, 217, 317, 417, 617 in FIGS. 3, 4, 5, 6, and 8. To prevent the fluid from draining from the first brake 774, the clutch feed line is latched, for example, in one of the ways explained above. To release the latched first brake 774, one of the control fluids is fed to unlatch the bypass valve or latch valve as explained above.

The control fluid could be fluid from the second brake 778 and/or the first clutch 772, for example, which are engaged when the transmission 14' is put into reverse, the third brake 780, which is normally engaged in second and sixth gear in this transmission 14', the second clutch 773, which is normally engaged in fourth, fifth, and sixth gears of the transmission 14', and/or line pressure. For example, referring to Table 2 above, the first control fluid in channel 234 could be fed from the first clutch 772, the second control fluid in channel 240 could be fed from the second clutch 773, and the clutch feed for the torque transmitting mechanism could be fed to the first brake 774. The control fluid source could alternatively be from part of the hydraulic control logic and not directly from a clutch feed. For example, a fluid that is pressurized when one or more of the clutch feeds is on, but is not directly from a clutch feed could be used. In one embodiment, a control fluid source is used that is pressurized when either the second clutch 773 or the second brake 778 are applied, but the control fluid source is not the clutch feeds for the second clutch 773 or the second brake 778. Although one of the latching fluid control systems 110, 210, 310, 410 or clutch control systems 590, 690 is described as being used in the transmission 14', it should be understood that the latching fluid control systems 110, 210, 310, 410 could alternatively be used in any other transmission.

Figure 10:
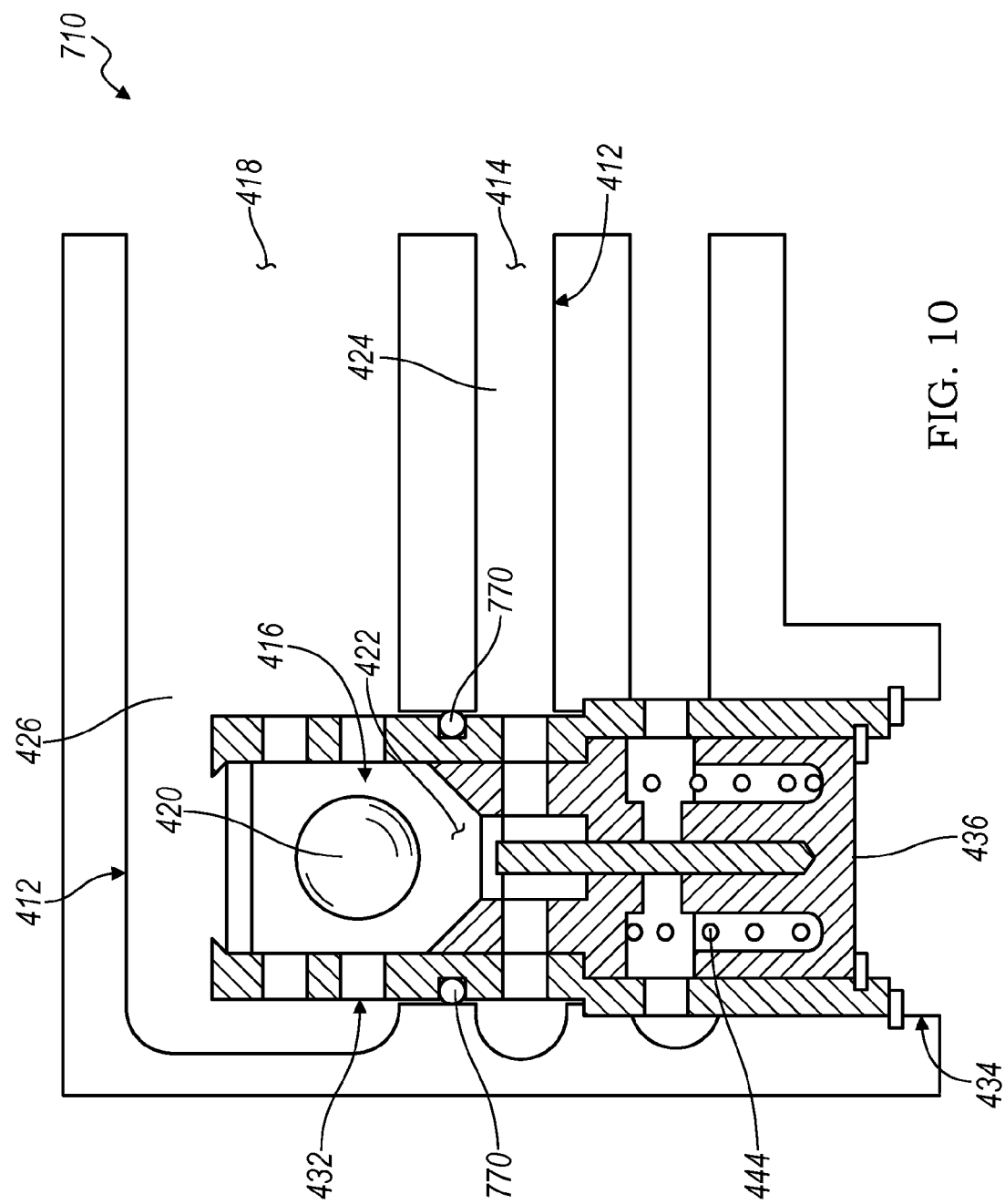
FIG. 10 is a cross-sectional view of one embodiment of a portion of the latching clutch control systems schematically illustrated in FIGS. 3A, 4A, 5A, and 6A, in accordance with the principles of the present disclosure.

Referring to FIG. 10, another cross-sectional view of a latching clutch control system 710 is illustrated. The configuration of FIG. 10 may be implemented with any of the schematic drawings of the latching clutch control systems 110, 210, 310, 410, or variations thereof, illustrated above. Specifically, the latching control system is implemented with the latching clutch control system 410 of FIG. 6, in this embodiment. The latching clutch control 710 illustrates the one-way valve 416 being integrated into the latching valve 432. The latching clutch control system 710 may operate similarly to the latching clutch control systems 410 described above. Accordingly, the latching clutch control system 710 has a clutch feed channel 412, an inlet 414 to the clutch feed channel 412, an inlet portion 424 of the clutch feed channel 412, a clutch portion 426 of the clutch feed channel 412, a ball 420 that seats across channel 422, a spring 444, one or more control fluid passages 434, and one or more sides 436 of the latching valve 432 upon which control fluid acts, all of which operate as described above. The latching valve 432 may slide within the clutch feed channel 412, and the latching valve 432 may be surrounded by one or more seals 770.

Referring now to FIG. 11, a control fluid circuit 590' is illustrated, which is a variation of the control fluid circuit 590 of FIG. 7. More particularly, instead of ball check-valves being used as the one-way valves 552, the control fluid circuit 590' includes a shuttle valve 552' that is used allow the flow of fluid from one of the control feed lines C1, C2 to the exclusion of the other control feed line C1, C2. (In this control fluid circuit 590', only two control feed lines C1, C2 are present). The control fluid circuit 590' may be connected to any of the control fluid passages 134, 234, 240, 334, 434 hereinbefore described, which are used to open the bypass valve 132, 232, 332 or latch valve 432, respectively. The control feed lines C1, C2 are hydraulically linked to a single feed channel 548', wherein the feed channel 548' is in fluid communication with one or more of the control fluid passages 134, 234, 240, 334, 434 via outlet 548A. If either of the control feed lines C1, C2 is turned on or engaged, such that hydraulic fluid flows through them, the hydraulic fluid from the respective control feed line C1, C2 will provide fluid through the feed channel 548' and into the connected control fluid channel 134, 234, 240, 334, and/or 434.

The first control feed line C1 has a clutch channel 550A in fluid communication with the feed channel 548', and the second control feed line C2 has a clutch channel 550B in fluid communication with the feed channel 548'. The shuttle valve 552' allows fluid to flow from one of the control feed lines C1, C2 to the feed channel 548' at a time. In other words, the shuttle valve 552' either allows fluid to flow from the first control feed line C1 via the first clutch channel 550A to the feed channel 548' as shown solidly in FIG. 11, or the shuttle valve 552' moves to allow fluid to flow from the second control feed line C2 via the second clutch channel 550B to the feed channel 548' as shown with dotted lines in FIG. 11. The control fluid circuit 590' thus controls the bypass valve 132, 232, 332 or latch valve 432 with either control feed line C1 or C2.

The description of the invention is merely exemplary in nature and variations that do not depart from the gist of the invention are intended to be within the scope of the invention. For example, the elements of the various figures may be combined in any suitable manner, without falling beyond the spirit and scope of the present invention. The valves, including the check-valves, and the channels, passages, and/or lines are intended for illustration purposes only. The valves, including the check-valves, may have any other suitable configuration, without falling beyond the spirit and scope of the present invention. Further, the channels, passages, and/or lines may have any suitable shape or configuration, without falling beyond the spirit and scope of the present invention. The valves and the channels, passages, and/or lines may be configured in any suitable manner to achieve the outcome of latching and unlatching hydraulic fluid within a cavity of a torque transmitting device. Further, any of the embodiments could have one, zero, or multiple control fluid passages, such as the control fluid passages 234, 240 illustrated in FIGS. 4A-4B. For example, the use of more than one control fluid passage could be applied to the embodiments of FIGS. 3, 5, 6, and 10, or any other embodiment herein. Such variations are not to be regarded as a departure from the spirit and scope of the invention.

What is claimed is:

1. A hydraulic fluid latching system for a torque transmitting device of a vehicular transmission, the hydraulic fluid latching system comprising:
   a clutch feed channel having an inlet portion and a clutch portion, the inlet portion configured to provide hydraulic fluid from a pressurized source to the clutch portion, the clutch portion being configured to provide hydraulic fluid to a torque transmitting device; and
   a one-way inlet valve hydraulically connecting the inlet portion of the clutch feed channel to the clutch portion of the clutch feed channel, and wherein the one-way inlet valve allows hydraulic fluid to flow from the inlet portion to the clutch portion when the torque transmitting device is engaged, to close and to trap hydraulic fluid within the torque transmitting device when the torque transmitting device is not actively pressurized through the inlet portion, to open when the pressure of hydraulic fluid within the inlet portion of the clutch feed channel exceeds the pressure of hydraulic fluid within the clutch portion of the clutch feed channel, and to close when the pressure of the hydraulic fluid in the clutch portion of the clutch feed channel exceeds the pressure of the hydraulic fluid in the inlet portion of the clutch feed channel, and
   a bypass valve configured to selectively open to drain fluid from clutch portion of the clutch feed channel.

2. The hydraulic fluid latching system of claim 1, wherein the bypass valve connects the inlet portion with the clutch portion of the clutch feed channel, the bypass valve being disposed in parallel with the inlet valve.

3. The hydraulic fluid latching system of claim 2, further comprising a pressure regulator connecting the inlet portion with the clutch portion of the clutch feed channel, the pressure regulator being disposed in parallel with the bypass valve and the inlet valve.

4. The hydraulic fluid latching system of claim 3, further comprising a control channel configured to provide a control pressurized hydraulic fluid to the bypass valve to open the bypass valve, wherein opening the bypass valve establishes fluid communication between the inlet portion and the clutch portion of the clutch feed channel.

5. The hydraulic fluid latching system of claim 4, wherein the inlet valve is a ball check-valve and the pressure regulator is a blow-off valve configured to maintain a pressure differential between the inlet portion and the clutch portion of the clutch feed channel.

6. The hydraulic fluid latching system of claim 5, wherein the bypass valve is configured to open when the pressure of the control pressurized fluid exceeds the pressure of the hydraulic fluid in the inlet portion of the clutch feed channel.

7. The hydraulic fluid latching system of claim 5, wherein the inlet valve is integrated into the bypass valve.

8. The hydraulic fluid latching system of claim 4, wherein the control channel is a first control channel configured to provide a first control pressurized hydraulic fluid to the bypass valve, the hydraulic fluid latching system further comprising a second control channel configured to provide a second control pressurized hydraulic fluid to the bypass valve to open the bypass valve.

9. A hydraulic control system in a transmission, the hydraulic control system comprising:
a source of pressurized hydraulic fluid for providing a pressurized hydraulic fluid;
a main line circuit in fluid communication with the source of pressurized hydraulic fluid;
a clutch feed channel in fluid communication with the source of pressurized hydraulic fluid, the clutch feed channel having an inlet portion and a clutch portion, the inlet portion configured to provide hydraulic fluid from the main line circuit to the clutch portion, the clutch portion being configured to provide hydraulic fluid to a torque transmitting device;
an inlet valve connecting the inlet portion of the clutch feed channel to the clutch portion of the clutch feed channel, and wherein the inlet valve configured to open to allow hydraulic fluid to flow from the inlet portion to the clutch portion when the torque transmitting device is engaged, to close to trap hydraulic fluid within the torque transmitting device when the torque transmitting device is not actively pressurized through the inlet portion, to open when the force caused by the pressure of the hydraulic fluid in the inlet portion of the clutch feed channel exceeds the force caused by the pressure of hydraulic fluid in the clutch portion of the clutch feed channel, and to close when the force caused by the pressure of the hydraulic fluid in the clutch portion of the clutch feed channel exceeds the forced caused by the pressure of the hydraulic fluid in the inlet portion of the clutch feed channel; and
a bypass valve configured to selectively open to drain hydraulic fluid from the clutch portion of the clutch feed channel.

10. The hydraulic control system of claim 9, wherein the bypass valve connects the inlet portion with the clutch portion of the clutch feed channel, the bypass valve being disposed in parallel with the inlet valve.

11. The hydraulic control system of claim 10, further comprising a pressure regulator connecting the inlet portion with the clutch portion of the clutch feed channel, the pressure regulator being disposed in parallel with the bypass valve and the inlet valve.

12. The hydraulic control system of claim 11, further comprising a control channel configured to provide a control hydraulic fluid to the bypass valve to open the bypass valve, wherein opening the bypass valve establishes fluid communication between the inlet portion and the clutch portion of the clutch feed channel.

13. The hydraulic control system of claim 12, wherein the control channel is in communication with the main line circuit, the bypass valve being configured to open when the pressure of the control hydraulic fluid exceeds the pressure of the hydraulic fluid in the inlet portion of the clutch feed channel, the pressure of the hydraulic fluid in the inlet portion being configured to exceed the pressure of the control hydraulic fluid when the torque transmitting device is actively pressurized through the inlet portion.

14. A multiple speed automatic transmission comprising:
an input member;
an output member;
first, second, and third planetary gear sets each having first, second and third members;
a first interconnecting member continuously interconnecting the first member of the first planetary gear set with the second member of the second planetary gear set;
a second interconnecting member continuously interconnecting the second member of the first planetary gear set with the third member of the third planetary gear set;
a third interconnecting member continuously interconnecting the third member of the second planetary gear set with the second member of the third planetary gear set; and
five torque transmitting devices each selectively engageable to interconnect at least one of the first, second, and third members with at least one other of the first members, second members, third members and a stationary member,
wherein the torque transmitting devices are selectively engageable to establish a plurality of forward speed ratios and at least one reverse speed ratio between the input member and the output member, and
wherein a first torque transmitting device of the five torque transmitting devices is in communication with a clutch feed channel having an inlet portion and a clutch portion, the inlet portion configured to provide hydraulic fluid from a pressurized source to the clutch portion, the clutch portion being configured to provide hydraulic fluid to the first torque transmitting device;
wherein a one-way inlet valve connects the inlet portion of the clutch feed channel to the clutch portion of the clutch feed channel, and wherein the inlet valve configured to open to allow hydraulic fluid to flow from the inlet portion to the clutch portion when the torque transmitting device is engaged, to close to trap hydraulic fluid within the first torque transmitting device when the first torque transmitting device is not actively pressurized through the inlet portion, to open when the force caused by the pressure of the hydraulic fluid in the inlet portion of the clutch feed channel exceeds the force caused by the pressure of hydraulic fluid in the clutch portion of the clutch feed channel, and to close when the force caused by the pressure of the hydraulic fluid in the clutch portion of the clutch feed channel exceeds the forced caused by the pressure of the hydraulic fluid in the inlet portion of the clutch feed channel; and wherein a bypass valve is configured to selectively open to drain hydraulic fluid from the clutch portion of the clutch feed channel.

15. The multiple speed automatic transmission of claim 14, wherein the first torque transmitting device is selectively engageable to interconnect the third member of the first planetary gear set with the stationary member; a second torque transmitting device of the five torque transmitting devices is selectively engageable to interconnect the first member of the third planetary gear set with the first member of the second planetary gear set; a third of the five torque transmitting devices is selectively engageable to interconnect the second member of the third planetary gear set and the third member of the second planetary gear set with the first member of the second planetary gear set; a fourth of the five torque transmitting devices is selectively engageable to interconnect the second member of the third planetary gear set and the third member of the second planetary gear set with the stationary member; and a fifth of the five torque transmitting devices is selectively engageable to interconnect the first member of the third planetary gear set with the stationary member.

16. The multiple speed automatic transmission of claim 15, wherein the input member is continuously connected for common rotation with the first member of the second planetary gear set, and the output member is continuously connected for common rotation with the second member of the first planetary gear set and the third member of the third planetary gear set.

* * * * *